United States Patent
McCann et al.

(10) Patent No.: US 8,387,075 B1
(45) Date of Patent: Feb. 26, 2013

(54) COMMON SCHEDULING AND SYNCHRONIZATION PRIMITIVES

(75) Inventors: Peter J. McCann, Mason, NH (US); Christopher M. Gould, Leominster, MA (US); Jeffrey A. Brown, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 1370 days.

(21) Appl. No.: 12/079,648

(22) Filed: Mar. 28, 2008

(51) Int. Cl.
*G06F 3/00* (2006.01)

(52) U.S. Cl. ....................................................... 719/328

(58) Field of Classification Search ................. None
See application file for complete search history.

(56) References Cited

U.S. PATENT DOCUMENTS

| | | | | |
|---|---|---|---|---|
| 5,931,923 A * | 8/1999 | Roberts | 710/36 |
| 6,154,847 A * | 11/2000 | Schofield et al. | 714/4.4 |
| 7,117,481 B1 * | 10/2006 | Agesen et al. | 717/120 |
| 7,320,063 B1 * | 1/2008 | Grohoski et al. | 712/214 |
| 2003/0140179 A1 * | 7/2003 | Wilt et al. | 709/321 |
| 2003/0221071 A1 * | 11/2003 | McKenney et al. | 711/152 |
| 2005/0102681 A1 * | 5/2005 | Richardson | 719/321 |
| 2006/0117325 A1 * | 6/2006 | Wieland et al. | 719/321 |

OTHER PUBLICATIONS

Brinch Hansen, Per, "Operating System Principles" 1973 by Prentice-Hall, Inc., Englewood Cliffs, NJ, pp. 93-122.
Custer, Helen, "Inside Windows NT", 1993 by Microsoft Press, Redmond WA, p. 53 and pp. 223-224, pp. 231-234.
U.S. Appl. No. 11/824,506, filed Jun. 29, 2007, Gould et al.

* cited by examiner

*Primary Examiner* — S. Sough
*Assistant Examiner* — Carina Yun
(74) *Attorney, Agent, or Firm* — Muirhead and Saturnelli, LLC

(57) ABSTRACT

Described are techniques for executing code performing one or more operations corresponding to scheduling and synchronization primitives. During execution of the code, a call is performed using an application programming interface requesting a first of the operations corresponding to one of said scheduling and synchronization primitives. During runtime in response to said call, it is determined whether to perform the first operation. The determining step uses a set of one or more criteria indicating conditions as to when the scheduling and synchronization primitives are allowed to be performed. The one or more criteria are determined in accordance with a plurality of different platforms. If it is determined that the first operation is allowable and the first operation is to be performed, then the code can be executed on each of the different platforms in a privileged execution mode and a non-privileged execution mode.

20 Claims, 18 Drawing Sheets

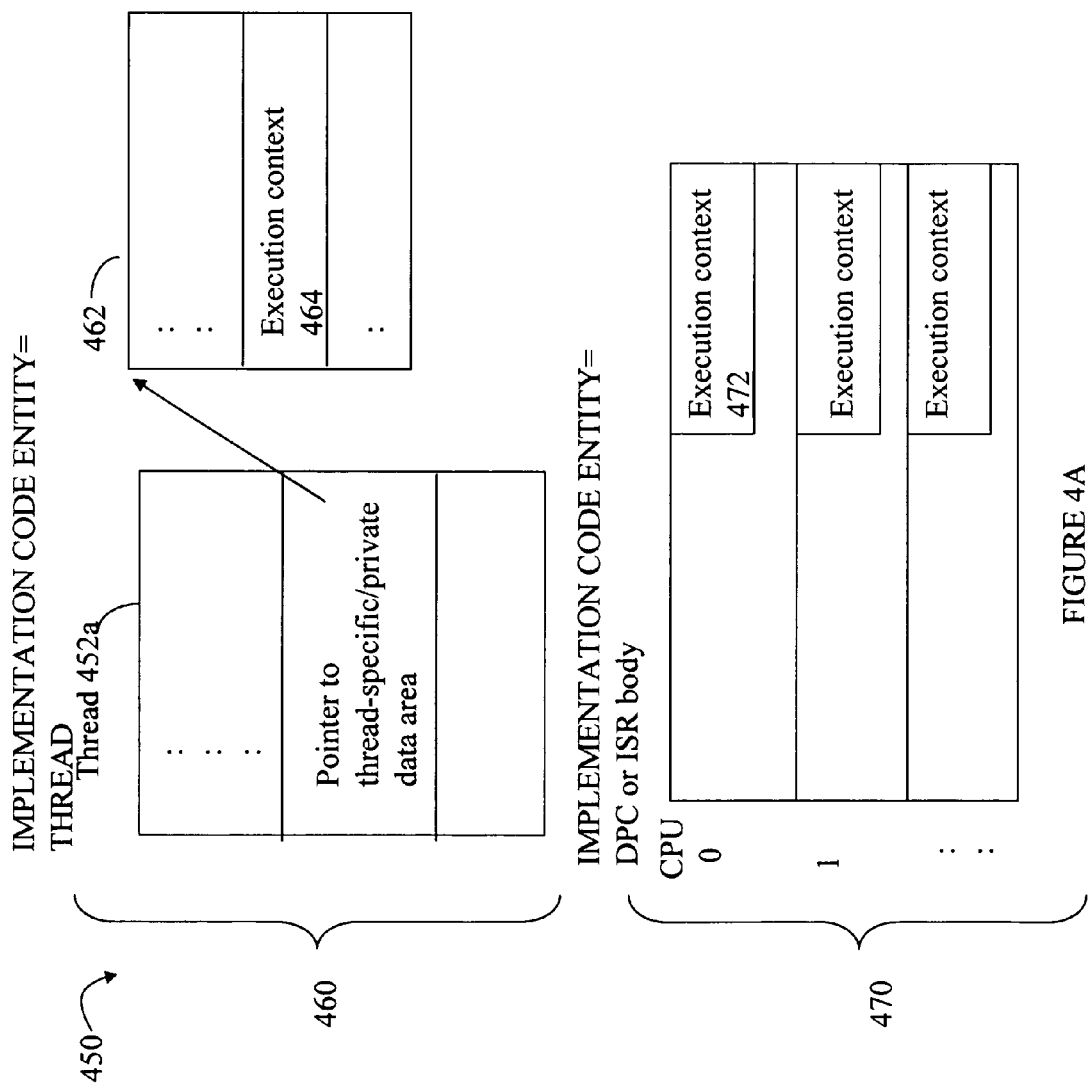

COMMON SCHEDULING AND SYNCHRONIZATION PRIMITIVES

BACKGROUND

1. Technical Field

This application generally relates to scheduling and synchronization primitives, and more particularly to techniques used for providing a common set of scheduling and synchronization primitives as may be used during code execution.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

A data storage system environment may consist of a wide variety of different hardware and software. For example, a data storage system may use a variety of different operating systems, hardware platforms, file systems, and the like. Problems may arise in connection with development of new code modules as well as for existing code modules intended for execution on data storage systems in order for the code modules to be usable in the different environments.

Thus, it may be desirable to utilize a flexible architecture and framework which allows a same code module to be used in the variety of different data storage system environments.

SUMMARY OF THE INVENTION

In accordance with one aspect of the invention is a method of executing code performing one or more operations corresponding to scheduling and synchronization primitives, the method comprising: performing, by said code during execution of said code, a call using an application programming interface requesting a first of said operations corresponding to one of said scheduling and synchronization primitives; and determining, during runtime in response to said call, whether to perform said first operation, said determining using a set of one or more criteria indicating conditions as to when said scheduling and synchronization primitives are allowed to be performed, said one or more criteria being determined in accordance with a plurality of different platforms, if said determining determines that said first operation is allowable and said first operation is to be performed, then said code can be executed on each of said different platforms in a privileged execution mode and a non-privileged execution mode. The conditions may indicate allowable execution contexts using an execution level and a spin lock held indicator. The execution level may indicate a runtime execution context level associated with said other code at a current execution point and the spin lock held indicator may provide a runtime indication as to whether a spin lock is currently acquired at said current execution point. The execution level may be set to one of a plurality of execution level values, said plurality of execution level values including a thread level, a deferred procedure call level and an interrupt level, said thread level indicating that said current execution point corresponds to a body of code associated with a thread or a deferred work item, said deferred procedure call level indicating that said current execution point corresponds to a body of code associated with a deferred procedure call or a timer, and said interrupt level indicating that said current execution point corresponds to a body of code associated with an interrupt service routine. The method may also include updating said execution level and said spin lock held indicator during execution of said code to reflect a current runtime execution state of said code. The execution level and said spin lock held indicator may be examined prior to performing said first operation to determine whether to perform said first operation. Each of the plurality of different platforms may include at least one of an operating system or hardware which is different from another of said plurality of different platforms. The application programming interface may provide an interface to a code module that performs said one or more operations when said code executes in a non-privileged that is user mode, and performs said one or more operations when said code executes in a privileged mode that is kernel mode. If said code executes in a user mode that is said non-privileged execution mode, said first operation may be performed in accordance with a set of semantics, and if said code executes in a kernel mode that is said privileged execution mode, said first operation may be performed in accordance with said set of semantics so that runtime behavior exhibited when said first operation is performed while executing in said user mode is similar to runtime behavior exhibited when said first operation is performed while executing in said kernel mode. The scheduling and synchronization primitives may perform operations on objects and said application programming interface includes one or more methods which perform said operations on said objects. The code may include a first call using said application programming interface to perform one of said operations in connection with a mutual exclusion lock, a spin lock, a condition variable, a semaphore, and an event, and said application programming interface provides an interface to instantiate an object corresponding to a thread, a deferred procedure call, or an interrupt service routine.

In accordance with another aspect of the invention is a computer readable medium comprising code stored thereon for providing a set of one or more scheduling and synchronization primitives, the computer readable medium comprising code stored thereon for: providing an application programming interface for performing one or more operations, each of said one or more operations corresponding to one of said scheduling and synchronization primitives; providing a set of one or more criteria indicating conditions as to when said scheduling and synchronization primitives are allowed to be performed; and determining, using said one or more criteria during execution of other code, whether to perform a requested one of said operations, said other code making a call using said application programming interface to perform said requested operation, said one or more criteria being determined in accordance with a plurality of different platforms, if said determining determines that said requested one of said operations is allowable and said requested operation is to be performed, then said other code can be executed on each of said different platforms in a privileged execution mode and a non-privileged execution mode. The conditions may indicate allowable execution contexts using an execution level and a spin lock held indicator, said execution level indicating a runtime execution context level associated with said other code at a current execution point, said spin lock held indicator providing a runtime indication as to whether a spin lock is currently acquired at said current execution point. The execution level may be set to one of a plurality of execution level values, said plurality of execution level values including a thread level, a deferred procedure call level and an interrupt level, said thread level indicating that said current execution point corresponds to a body of code associated with a thread or a deferred work item, said deferred procedure call level indicating that said current execution point corresponds to a body of code associated with a deferred procedure call or a timer, and said interrupt level indicating that said current execution point corresponds to a body of code associated with an interrupt service routine. The computer readable medium may also include code for updating said execution level and said spin lock held indicator during execution of said other code to reflect a current runtime execution state of said other code. The execution level and said spin lock held indicator may be examined prior to performing said requested operation to determine whether to perform said requested operation. Each of the plurality of different platforms may include at least one of an operating system or hardware which is different from another of said plurality of different platforms. The application programming interface may provide an interface to a code module stored on said computer readable medium that: performs said one or more operations when said other code executes in said non-privileged execution mode that is user mode; and performs said one or more operations when said other code executes in said privileged execution mode that is kernel mode. The other code can be executed in a user mode that is said non-privileged execution mode and a kernel mode that is said privileged execution mode, and said requested one of said operations may be performed in said user mode and said kernel mode in accordance with a same set of semantics so that runtime behavior exhibited when said requested one of said operations is performed while executing in said user mode is similar to runtime behavior exhibited when said requested one of said operations is performed while executing in said kernel mode. The scheduling and synchronization primitives may perform operations on objects and said application programming interface includes one or more methods which perform said operations on said objects.

In accordance with another aspect of the invention is a data storage system comprising code stored on a computer readable medium for providing a set of one or more scheduling and synchronization primitives, the computer readable medium comprising code stored thereon for: providing an application programming interface for performing one or more operations, each of said one or more operations corresponding to one of said scheduling and synchronization primitives; providing a set of one or more criteria indicating conditions as to when said scheduling and synchronization primitives are allowed to be performed, said conditions indicating allowable execution contexts using an execution level and a spin lock held indicator; and determining, during execution of other code, whether to perform a requested one of said operations using said one or more criteria, said other code making a call using said application programming interface to perform said requested operation, said one or more criteria being determined in accordance with a plurality of different platforms so that said other code is portable to each of said different platforms, and wherein said other code is executing in one of a user mode or a kernel mode, and said requested operation is performed in said user mode if said other code is executing in said user mode and is performed in said kernel mode if said other code is executing in said kernel mode, said criteria including kernel-mode semantics for features of said kernel mode simulated when executing in said user mode.

BRIEF DESCRIPTION OF THE DRAWINGS

Features and advantages of the present invention will become more apparent from the following detailed description of exemplary embodiments thereof taken in conjunction with the accompanying drawings in which:

FIG. 4A is an example illustrating data structures that may be used in connection with storing execution contexts in an embodiment;

FIGS. 10-11A are an example illustrating execution of code having a DPC execution level in user mode;

DETAILED DESCRIPTION OF EMBODIMENT(S)

Figure 1:
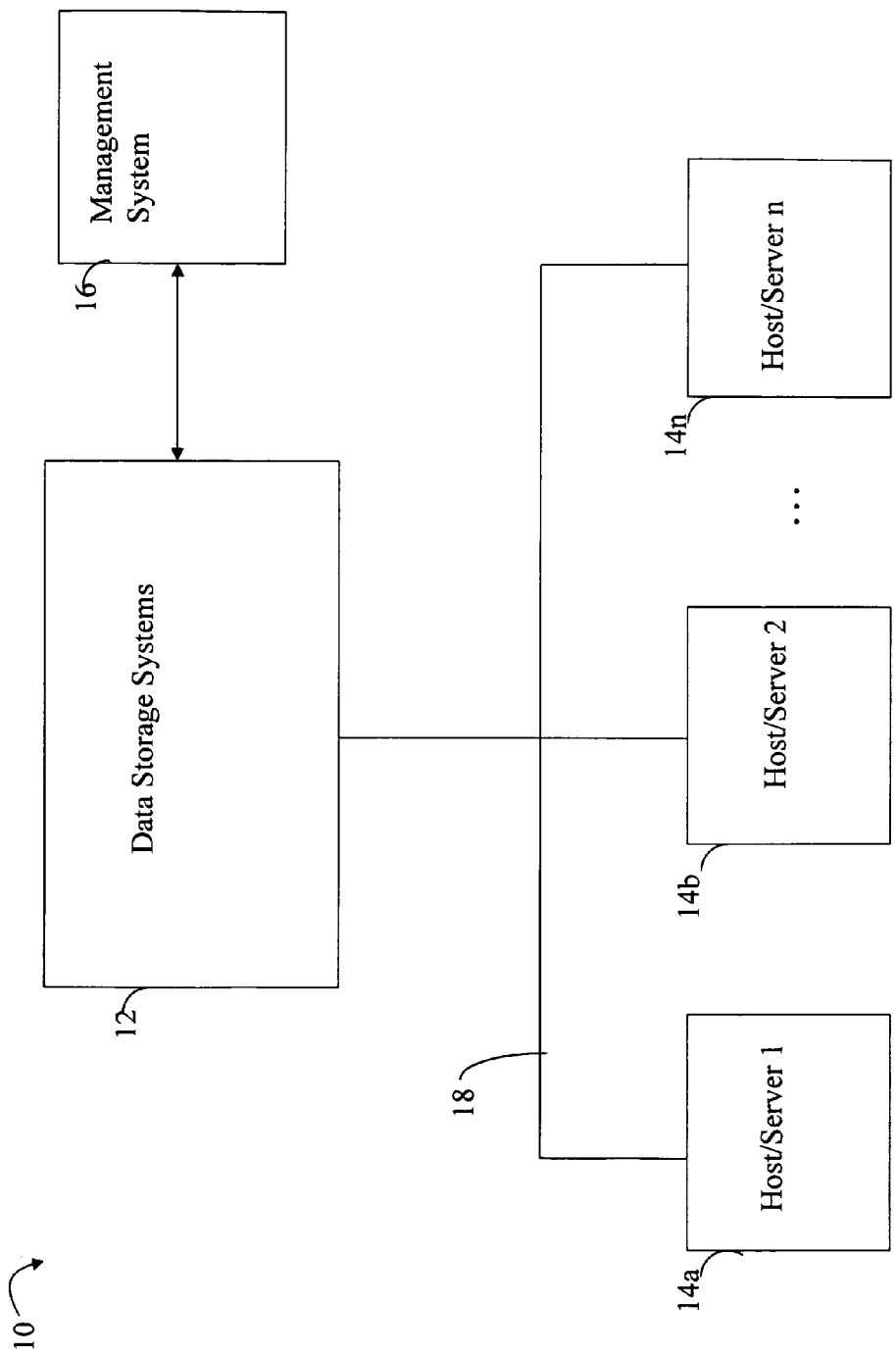
FIG. 1 is an example of an embodiment of a computer system that may utilize the techniques described herein.

With the growing popularity of all types of data storage devices, there is also a growing demand for software and features for data storage devices. However, developing software components for the devices is a difficult task because storage devices operate under constraints which at least in some cases are distinct or prioritized differently from those imposed on other types of computing systems.

For example, data storage devices require solutions to different sets of problems. A wide variety of data storage hardware solutions are available in the market. The solutions require significant efforts from software developers to provide high performance and reliability and other desired storage features and to integrate them with software solutions that would present to the end-customers easy and friendly user-interfaces. In addition, providers of hardware solutions are challenged to provide reasonable hardware-to-software interface mechanisms.

In many cases these constraints have resulted in providing largely static and non-expandable programming environments for data storage devices. The programming environments for these devices also tend to lack a common or standard interface to handle the integration of software components in a data storage environment. Thus, the creation of component-oriented software is rendered difficult and becomes a custom solution. Accordingly, conventional programming and testing environments for such devices present a substantial obstacle to software developers for such devices. Adding functionality to the operating system of a storage device can be difficult. Adding the same functionality to a storage device having a different operating system may require in general not only a different set of function calls and programming methods, but a different programming environment altogether.

Examples of conventional methods providing platform independence include the CORBA architecture and Sun Microsystems' Java. A CORBA architecture employs a middle layer called Object Request Broker ("ORB") to facilitate integration of software objects. The middle layer requires memory and a CPU's processing power.

A conventional Java architecture employs a virtual machine which provides platform independence at run-time. A virtual machine facilitates different object components to find each other, and the object components interact with each other via the virtual machine. Because object components interact and execute via the virtual machine versus execution of native code of the underlying processor, the processing speed is noticeably slowed down in a Java architecture. In addition, the virtual machine requires a large amount of memory and only executes code in user space. Furthermore, a software developer is required to use the Java language, and thus needs to expend a large amount of time and effort to become versatile in using a Java system. In addition, a large amount of legacy code written in non-Java language becomes unavailable in a Java architecture.

It is desirable to have flexible and platform independent programming environments for storage devices, especially given the growing demand for storage devices having a variety of different data storage system environments.

As described at least in part below, a storage software platform architecture can be provided that converges and leverages existing platform capabilities and technologies with other assets to provide a sustainable advantage.

In at least some implementations the architecture allows developers to focus on the customer experience and quality, improved product scalability, reliability, and availability, innovation in response to customer need, development of best of breed products and solutions, product line breadth, and enterprise and data center technologies. In at least some implementations the architecture also facilitates development and/or improvement in key areas such as convergence and leverage, ease of use, channel readiness, consistency and flexibility, application awareness, storage solutions and services, success at the lower end of the market, and efficiency, productivity, and focus of development resources.

In at least one aspect, the architecture is or includes a scalable, common architecture that can be extended across many technical and industry dimensions, and that takes into account that performance considerations vary, that availability and quality concerns may be high but have different complexities, that security is constant (but with perimeter versus internal security priorities varying), and that many different topologies exist. In at least one implementation, the architecture is or includes a unified architecture for integrated management of network attached storage (NAS), and object and storage block services.

The architecture may include features such as openness, application awareness, ease of use and management, partner enablement, scaling, globalization, enhanced platform architecture, and enhanced availability and reliability. Openness may rely on and/or leverage proprietary and third party technologies for accessibility and user interface. Application awareness may include automated discovery, application provisioning, and self-management. Ease of use and management may include a unified user experience, total lifecycle coverage, self-management, and active communities. Partner enablement may include features that facilitate sales channels and OEM arrangements. Scaling may include a range from small and medium size businesses to enterprise, and may include scaling up and scaling out. Globalization may include fully internationalized systems, with localized user interface screens and behavior. Enhanced platform architecture may include modular building blocks and well defined interfaces. Enhanced availability and reliability may include fault domains and autonomous management.

At least one implementation of the architecture takes into account that, from a high level perspective, many different storage platforms have many of the same features, such as moving data from one I/O chip to memory to another I/O chip, high availability, clustering, peer to peer replication, and drive management, and such platforms also support similar interface protocols, transformations, and methods. However, if such platforms have significantly varying implementations and external interfaces, and little commonality, development involves significant duplication of functionality and work, and it can be difficult to move technology or techniques from platform to platform, share or reuse technology or techniques, combine technology or techniques from different platforms together or with new applications, or otherwise avoid doing the same work multiple times. For example, if a new feature or new standard is needed, the new feature or standard must be implemented separately for each platform.

A convergence-oriented common software environment based on the architecture takes into account different base architectural assumptions, different terminology for similar concepts, different behaviors or expressions for similar features, different high availability, different clustering, scaling, and non destructive upgrade models, different wire protocols (e.g., replication, mainframe), and different management interfaces and look-and-feel interfaces. As a result, the environment takes into account different software environments, different base operating systems dictating hardware, and different hardware dictating base operating systems.

Thus, the common software environment enables mechanical commonality as a prelude to enabling architectural commonality, with the results that the value of developed technology increases, commonality increases, it takes less work to maintain the same base of functions or add features, flexibility increases, the ability to effect rapid change is improved, technology and techniques are freed from existing mechanical then architectural constraints, the ability to combine existing technology and techniques with new technology and techniques in new ways increases, lost opportunity costs are regained, resources are freed up to refactor and rationalize rather than rewrite or discard current technology or techniques, the underlying basics of technology is preserved, enabling virtualization, code is strengthened by preserving field experience, development, testing, and support are made more efficient, and reliability is improved.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16.

In one embodiment, the one or more data storage systems 12 of FIG. 1 may be an appliance with hardware and software for hosting the data storage of the one or more applications executing on the hosts 14a-14n. The appliance may include one or more storage processors and one or more devices upon which data is stored. The appliance may include software used in connection with storing the data of the hosts on the appliance and also software used in connection with techniques described in following paragraphs which are part of a common software environment.

In another embodiment, the data storage systems 12 may include one or more data storage systems such as one or more of the data storage systems offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein for the common software environment.

Servers or host systems, such as 14*a*-14*n*, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In following paragraphs, reference may be made to a particular embodiment such as, for example, an embodiment in which element 12 of FIG. 1 is an appliance as described above. However, it will be appreciated by those skilled in the art that this is for purposes of illustration and should not be construed as a limitation of the techniques herein.

The common software environment may include components described herein executing on each data storage system. Each of the data storage systems may have any one of a variety of different hardware and software platforms comprising a supported environment. For example, a first data storage system may include the common software environment with a first operating system and underlying hardware. A second data storage system may include the common software environment with a different operating system and different underlying hardware.

The common software environment includes a framework which may be implemented using APIs (application programming interface) and other code modules described herein. The APIs may implement the underlying functionality which varies with the different possible data storage system hardware and software platforms. As such, code may be written using the APIs so that the code is insulated from the underlying platform dependencies. The code may be executed on any data storage system utilizing the APIs regardless of the particular hardware and/or software platform of the data storage system. Additionally, the API may be written so that the code is allowed to execute in user space or kernel space as will be described in more detail herein. As such, the API may utilize the underlying primitives of the particular operating system or may also emulate functionality on an operating system lacking a particular feature. A code module using the API can also execute in user mode or kernel mode on a supported operating system. For example, a code module may make a first API call on a data storage system having a first operating system. For the first operating system, the API may implement the first API call utilizing the underlying primitives of the first operating system. The code module may also be executed on another data storage system having a second different operating system. For the second operating system, the first API call may be implemented using the primitives of the second operating system. The second operating system may not have a rich or full set of primitives so the API may emulate the necessary functionality of the primitives missing from the second operating system. The API uses the underlying operating system primitives where available and may otherwise synthesize or emulate the functionality necessary as may vary with the capabilities of each operating system. The code module may also execute in user or kernel mode on the first and second operating systems.

Figure 2:
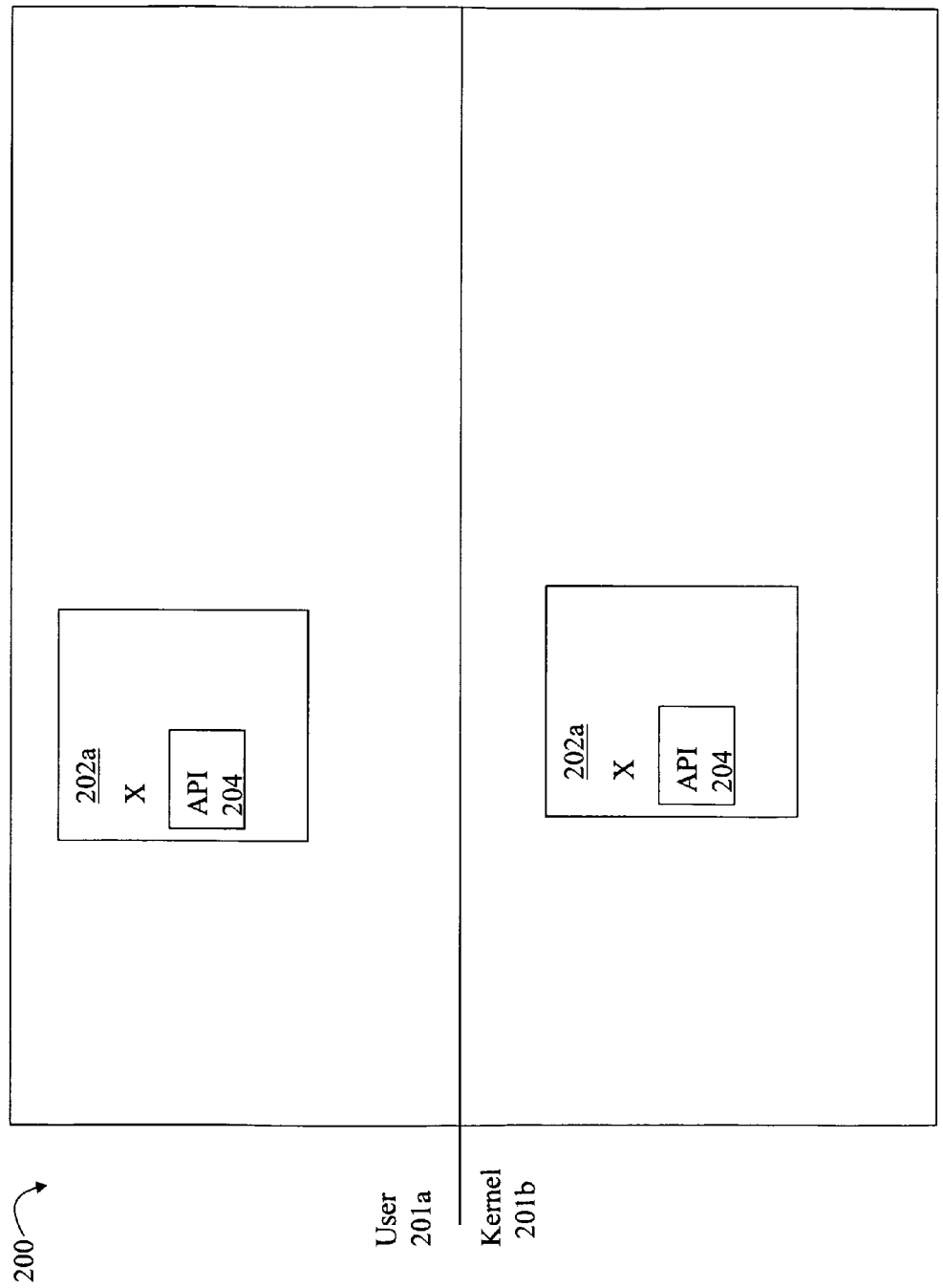
FIG. 2 is an example illustrating use of an API (application programming interface) in connection with a same code module that may be executed in user space and kernel space.

Referring to FIG. 2, shown is an example of components that may be executing on a processor node of a data storage system. If a data storage system has multiple processors, FIG. 2 illustrates components that may be executed by each such processor. In the example 200, shown are user mode or user space 201*a* and kernel mode or kernel space 201*b* with different entities executing in each mode. As known in the art, code executing in the kernel mode may be characterized as a privileged execution mode with unrestricted access to system memory and hardware devices. Operating system code typically executes in kernel mode. In contrast, code executing in user mode may be characterized as a non-privileged mode of execution with restricted access to the system memory and hardware devices. In the example 200, element 202*a* may be a code module executing in user space, such as a user space process or thread, and may utilize an API 204 to perform different operations. The same code module represented by element 202*a* may also be executed in kernel space. As will be described in following paragraphs using the common software environment herein, a code module 202*a* may use API 204 which implements user and kernel mode variations of necessary operations allowing the same code module 202*a* to execute in both user and kernel mode without modification to the original source code. In other words, for a given API call, any coding difference in implementing the API call when executing in user or kernel mode, different operating system, or other data storage system environment particular, may be embedded in the code of the API.

As will also be described in more detail herein, the API 204 may include code for scheduling and synchronization primitives. Scheduling and synchronization primitives may be used for synchronization between different executing code entities and to control access to shared resources. Each scheduling and synchronization primitive may be performed by making a call using an interface to code of the API 204 to perform a scheduling operation. The API 204 may also include other code for other defined interfaces performing operations besides those in connection with scheduling and synchronization primitives. In one embodiment, the API 204 may be an object-oriented API performing operations upon objects used for scheduling and synchronization.

In the example 200, the same code module 202*a* may execute in both user space and kernel space and use the same API 204. The underlying details implementing the functionality of the API call are embedded in the API code and not the code associated with 202*a*. Using the API 204, an embodiment may make a same set of functionality available to code that executes in both user and kernel space and leave the implementation details of the API calls to be included in the API code. The API may provide services to kernel space code which are implemented using, and may be otherwise only available to, code executing in user space. Similarly, the API may provide services to user space code which are implemented using, and may be otherwise only available to, code executing in kernel space. For example, a device driver or other code module typically executed in kernel mode may alternatively be executed in user mode with the ability to have multiple instances and allow a first instance of a driver to assist in recovery on failure of another device driver instance. As another example, during development of code that will execute in kernel mode, the code modules may be developed and executed in the user mode to facilitate debugging. At a later point once debugging is complete, the code may be executed in kernel mode unmodified.

As described above, the common software environment may include the API and other code modules to implement the framework providing the user-kernel portability as well as portability among different hardware and software platforms (e.g., different operating systems, data storage systems and underlying hardware, and the like). The common software environment may include other code provided as a layer between the API and operating system specific code, for example, to facilitate communications with devices.

As described above, the same API may be used by a code module when the code module is executed in user space, kernel space, and/or on different data storage systems having different environments such as different operating system and/or processor architecture. The code module may make API calls so that the API implements the same set of API calls to facilitate portability of the code module for execution in user space or kernel space or on any one of a variety of different software environments that may be supported in accordance with the functionality included in the API. Thus, a module coded using the API as described herein may be executed in user mode or kernel mode unmodified. Furthermore, the same module may be executed on different data storage systems having different data storage system environments provided the particular data storage system environment is supported by the API. Thus, processing dependencies that may vary with user or kernel mode as well as operating system and underlying processor architecture may be handled by the API code so that a module utilizing the API as described herein may be executed in a variety of different data storage system environments as well as user or kernel mode.

What will now be described is an example illustrating how the techniques herein may be used in connection with scheduling and synchronization primitives so that a same code module may be executed in user mode or kernel mode. In some instances, it may be desirable to execute a code module, such as a device driver, in user mode, for example, if the driver does not need to be shared among multiple processes. Otherwise, it may be more desirable to have the driver execute in kernel mode because sharing may be implemented more efficiently using code executing in kernel mode than user mode. Also, by executing code in user mode, multiple instances of the device driver can be available. A user-mode device driver that fails may be restarted using its recovered prior state without restarting the kernel and system (e.g., system reboot) as when there is a kernel-mode device driver failure. Furthermore, in a data storage system such as the CLARiiON™ data storage system from EMC Corporation, there may be multiple storage processors (SPs) and each SP may execute an instance of a device driver or other code module for servicing requests.

Figure 2A:
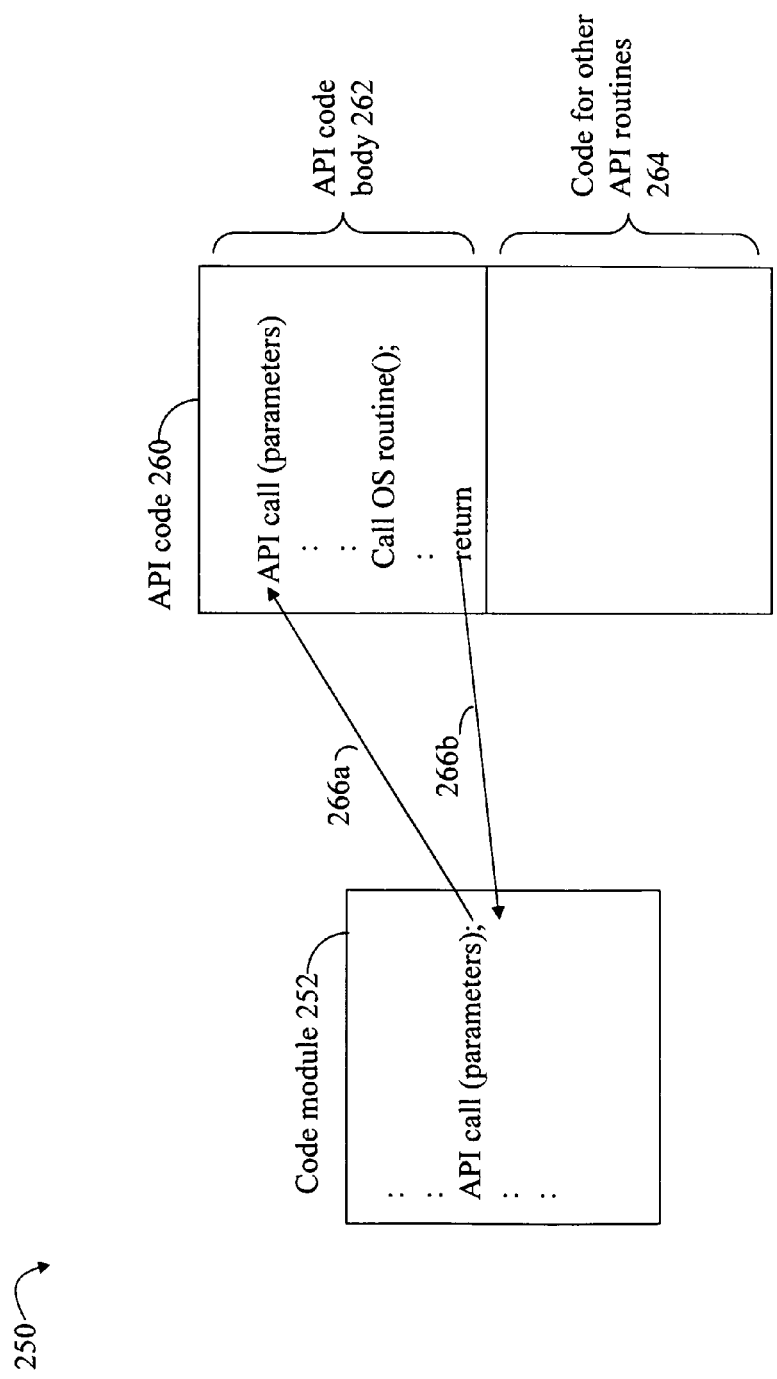
FIG. 2A is an example illustrating how code of the API may be used as a wrapper around platform-dependent calls to insulate a code module and promote portability in an embodiment using the techniques herein.

Referring to FIG. 2A, shown is an example illustrating general data flow between a code module and code of the API in accordance with techniques herein. The example 250 also illustrates the API code utilizing underlying native operating system functionality. The API code effectively provides a "wrapper" or layer of code around the underlying operating system calls that may be made to implement functionality of the particular API feature and operation. The API thus insulates the code module 252 from the different operating system specific calls that may be made to implement the API functionality providing portability of the code module across different operating systems that may be used in different execution environments. Similarly, the code module 252 is insulated from the coding differences that may occur in order to implement the API functionality in user and kernel mode. It should be noted that, as described herein, the underlying operating system functionality may vary with environment. Where a particular functionality needed to perform an operation, such as a scheduling and synchronization primitive, in connection with the API is not directly available in a native operating system, the functionality may be simulated using other functionality which is available in the native operating system.

The example 250 includes code module 252 which makes a call, "API call (parameters)", to code in the API. When the code module 252 is executed and the foregoing API call is made, control is transferred to an entry point in the API code 260 as indicated by 266a. The API code body 262 is executed and may invoke one or more operating system routines (OS routines) to implement the particular operation of the API call, such as a particular scheduling and synchronization primitive as will be described in following paragraphs. Subsequently, control is returned to the code module 252 as indicated by 266b when the API code body 262 has completed. It should be noted that in the example 250, the code module 252 calls a routine in the API. The code module 252 may code developed to run in user mode, kernel mode, and/or in any one of a variety of different environments each having a different operating system. As described in more detail elsewhere herein in one embodiment, the code module 252 may include code of a thread body, a deferred procedure call (DPC), or an interrupt service routine (ISR). It will be appreciated by those skilled in the art that a routine in the API 260 may also be invoked by other bodies of code including, for example, another API routine, operating system code, and the like. In any case, the API routine may return to the calling routine once the called API routine has completed.

The example 250 illustrates a template in which functionality provided in the native environment, such as by an operating system, may be used by the API so that user or developer code invokes the API rather than calling the underlying operating system routines directly. Such code which invokes the API rather than directly invoking the underlying operating system routines provides portability of the developed code module across user and kernel mode as well as the different supported environments.

In accordance with the techniques described herein, a same code module may be executed using scheduling and synchronization primitives of the API in both user space and kernel space meaning that the same set of operations are available in user space and kernel space. The scheduling and synchronization primitives may be implemented using code of the API to behave in a similar manner when executing code in user space and kernel space. In other words, the scheduling and synchronization primitives of the API may be implemented to exhibit runtime behavior in accordance with a same set of criteria in both user space and kernel space as well as on the different supported platforms and environments. The scheduling and synchronization primitives of the API may exhibit the same runtime behavior on different platforms as well as user and kernel space although the primitives may be implemented differently by the API depending on the functionality included in a native environment. As such, the API herein may implement and enforce a set of criteria for code including API calls corresponding to the scheduling and synchronization primitives to ensure portability of the code across user space, kernel space, and supported environments. The set of criteria in an embodiment may also be characterized as a set of rules reflecting the most restrictive supported environment to ensure portability across all supported environments, such as when executing the code in an environment including any one of the supported operating systems. Using the API herein for performing operations of the scheduling and synchronization primitives, features and operations which are typically only available when executing code in kernel mode are also available to code executing in user mode. Similarly, features and operations which are typically only available when executing code in user mode are also available to code executing in kernel mode. In one embodiment described in following paragraphs, the API may implement a set of scheduling and synchronization primitives in user mode to provide kernel mode functionality and semantics specified using the criteria.

The criteria may define the allowable runtime behavior in connection with interactions between different scheduling and synchronization primitives. Additionally, the criteria may define the runtime behavior with respect to what scheduling and synchronization primitives can be performed in accordance with a current execution context associated with code executing at runtime. As an example, currently executing code may not be allowed to perform a first scheduling and synchronization primitive under certain conditions as indicated by the one or more criteria.

The API may include code to perform operations on classes of objects. In one embodiment, the API may include code to perform a set of operations, or methods, on each object. The API may include code and a defined interface to perform each of the operations in both user and kernel space and across the different supported environments.

What will now be described are scheduling objects for which different operations may be provided using the API. The objects and operations in connection with scheduling and synchronization primitives may be determined in accordance with the supported environments. The set of objects and operations may be determined as a union of all objects and operations that may be performed on all supported environments. For example, if the supported operating systems included one or more Windows-based operating systems, and LINUX, the list of objects and operations provided by the API may be based on the union of operations and objects for the foregoing supported operating systems. As a further example, if there is a scheduling object and associated operations provided in only the Windows-based operation system but not in LINUX, the API may provide support for performing the operations on the scheduling object across all supported environments for code portability across all supported environments in both user space and kernel space.

One embodiment may include support for performing operations on the following scheduling objects: mutual exclusion lock, spin lock, condition variable, thread, semaphore, manual reset event (MRE), automatic reset event (ARE), deferred procedure call (DPC), timer, and deferred work item (DWI). The operations performed on the objects may also be referred to as scheduling and synchronization primitives. Other embodiments may include support for different objects and operations than as described herein depending on the particular operating systems and functionality therein supported across different environments. The foregoing different scheduling objects will now be described in more detail. It should be noted that the API may include a common set of operations, such as create and terminate, that may be performed with respect to all the objects. The API may also include other operations that may vary with the particular object and scheduling or synchronization operations performed.

The mutual exclusion lock, or mutex lock, object may be used to enforce mutual exclusion to a critical region of code or a resource since only one thread at a time can hold the lock. Acquisition of the mutex lock is required prior to entering a critical region of code and the mutex lock is released upon exiting the critical region of code. An embodiment of the API may include, for example, operations to instantiate a mutex lock, acquire the mutex lock and release the mutex lock. If the mutex lock cannot be acquired by a thread, the thread is blocked and may enter a wait or sleep state until the mutex lock becomes available. A blocked thread waiting on a mutex lock is awakened or signaled when the lock becomes available upon release by another thread currently holding the mutex lock.

A spin lock object is a lock that may be used in a manner similar to the mutex lock (e.g., to enforce mutual exclusion of a resource or critical region of code) so that acquisition of the spin lock is required prior to accessing the resource or critical region of code. A thread trying to acquire the spinlock will enter a busy-wait (e.g., loop or spin) until the spin lock is unlocked or becomes available. With the mutex lock, a blocked thread will enter a wait state and may relinquish control of the processor to another thread for execution. In contrast, with a spin lock, the blocked thread continues execution with a busy wait or looping. An embodiment may include two different types of spin locks—interrupt disabling and non-interrupt disabling. With an interrupt disabling spin lock, when the spin lock is acquired, an interrupt cannot preempt the currently executing code which has acquired the spin lock. With a non-interrupt disabling spin lock, an interrupt can preempt executing code which has acquired the spin lock. It should be noted that an embodiment may also implement a single one of the foregoing types of spin locks.

A condition variable object is associated with a predicate or logical expression that evaluates to true or false based on shared data. The condition variable allows a thread to block on it and provides facilities to wake up one or more threads when the predicate changes. The condition variable provides for synchronization along with a signaling mechanism so that signaling can occur when the predicate state changes.

A thread object may be associated with a body of code that is executed. An API may include support for starting and terminating a thread as well as one or more other operations used for synchronization. For example, one or more other threads may be synchronizing or waiting for a particular thread to complete, reach a particular execution point, and the like. Operations may be provided by invoking code in the API using a defined interface so that, for example, upon the termination of the particular thread, the one or more other threads which are currently blocked and awaiting termination of the particular thread may be signaled and continue execution.

A semaphore object may be an integer valued variable that can be decremented (e.g. P operation) or incremented (V operation). If when decremented the semaphore has a value less than zero, the semaphore blocks (e.g., causes a requesting thread performing the decrementing operation to enter a wait or sleep execution state). Semaphores may occur in different variants such as a counting semaphore, where the associated integer value is greater than 1, and a binary semaphore (e.g., also referred to as the mutual exclusion lock described above) where the associated integer value=1. A counting semaphore may be used as a counter for a set of available resources. A semaphore may have an associated queue of threads. If a thread performs a P operation on a semaphore which has the value zero, the thread is added to the semaphore's queue. When another thread increments the semaphore by performing a V operation, and there are threads on the queue, one of the waiting or blocked threads is removed from the queue and resumes execution.

An embodiment may include an API providing operations on event objects, such as a manual reset event (MRE) object and an automatic reset event (ARE) object, used to signal a thread indicating that a particular event has occurred. The API may include support for performing operations in connection with MRE and ARE objects, for example, if the embodiment supports a Windows-based operating system. An MRE object is associated with an event that is manually set by a programmer or executing code. An MRE is an event object whose state remains signaled until it is explicitly reset to nonsignaled by executing code. While it is signaled, any number of waiting threads, or threads that subsequently specify the same event object, can be released. An ARE has a state that is set to signaled upon the occurrence of an event and the state is automatically reset to non-signaled when the first waiting thread successfully returns from the wait (i.e., "consumes" the event). In other words, if there are multiple threads waiting on occurrence of the event, only the first waiting thread consumes the event and is removed from the wait queue.

A deferred procedure call (DPC) object is an object associated with a body of code that is queued and then executed at a later point in time. Typically, the DPC is available only in kernel mode and may be characterized as a scheduled kernel mode callback which is performed at a later time. The DPC may be performed at a higher priority than other scheduled entities and is executed after any higher priority tasks. In the embodiment described herein, the DPC functionality may be made available to code executing on both user mode and kernel mode using the API. As known in the art, the DPC body of code is scheduled and performed as soon as possible. The DPC code body is not associated with a thread but is preferred work executed as soon as possible. A DPC may be queued, for example, when servicing an interrupt in order to perform remaining work for handling the interrupt. It should be noted that code associated with a queued DPC cannot block (e.g., code cannot perform an operation that may cause the code to enter a wait state such as if a mutex lock cannot be acquired). Therefore, code of a queued DPC may use a spin lock rather than a mutex lock.

A timer object may be associated with a body of code scheduled to be executed at a future point in time. The body of code may be associated with a queued DPC to be executed at a specified time or if a specified amount of time has elapsed. A timer object may be used, for example, in connection with an issued I/O operation. Code associated with a timer may be queued for execution at a point in time by which the I/O is expected to have completed so that if the I/O has not completed within a certain time, the timer will cause the I/O request to be aborted. If the I/O completes within the specified time, the timer may be canceled. It should be noted that code associated with a timer object may be subject to the same constraints, semantics and runtime behavior set forth regarding a DPC.

A deferred work item (DWI) object defers work done by a thread and executes at a thread priority level. A deferred work item is similar to a DPC in that the associated code is queued for execution at a later point. However, the code associated with a deferred work item runs at a thread priority level rather than an elevated DPC priority level. It should be noted that in an embodiment, code associated with servicing an interrupt may execute at a priority level higher than code associated with a DPC. Code associated with a thread may execute at a priority level lower than that associated with a DPC. A DWI may be used rather than a DPC since code associated with a DWI can block (e.g., perform operations using scheduling objects that may cause the code to enter a wait state such as when a mutex lock cannot be acquired), whereas code of a DPC cannot block (e.g., perform an operation that may cause the code to enter a wait state). It should be noted that code associated with a DWI object may be subject to the same constraints, semantics and runtime behavior set forth regarding a thread.

The foregoing objects and associated operations provided using the API may define a set of scheduling and synchronization primitives supported representing a union of all objects and operations across all supported environments and associated user and kernel execution modes. A same set of criteria is used to define the behavior that is acceptable when executing in any supported environment (e.g., such as any supported operating system) and when executing in user and kernel mode. The criteria may be defined in accordance with the most restrictive case so that the same code can be executed using any combination of supported hardware, software, user mode or kernel mode supported for the different environments. The set of supported scheduling and synchronization primitives may be a union of all possible operations across supported environments in both user and kernel mode. It should be noted that an embodiment may also define a set of scheduling and synchronization primitives which are supported across supported environments in both user and kernel mode. For example, the primitives associated with event objects, such as the MRE and ARE objects above, may be functionality typically including in a native Windows-based operating system but may not be implemented in a native LINUX operating system. In connection with the techniques herein, the API may include a defined interface for performing operations on MRE and ARE objects. If a code module performs a call into the API to perform an operation on an MRE, on a Windows-based operating system, the API may use native operating system functionality of the Windows-based operating system. If the same code module is executed on a LINUX operating system, the API may synthesize functionality, for example, using condition variables since support for the event objects and associated operations are not provided in the native LINUX operating system.

Figure 2B:
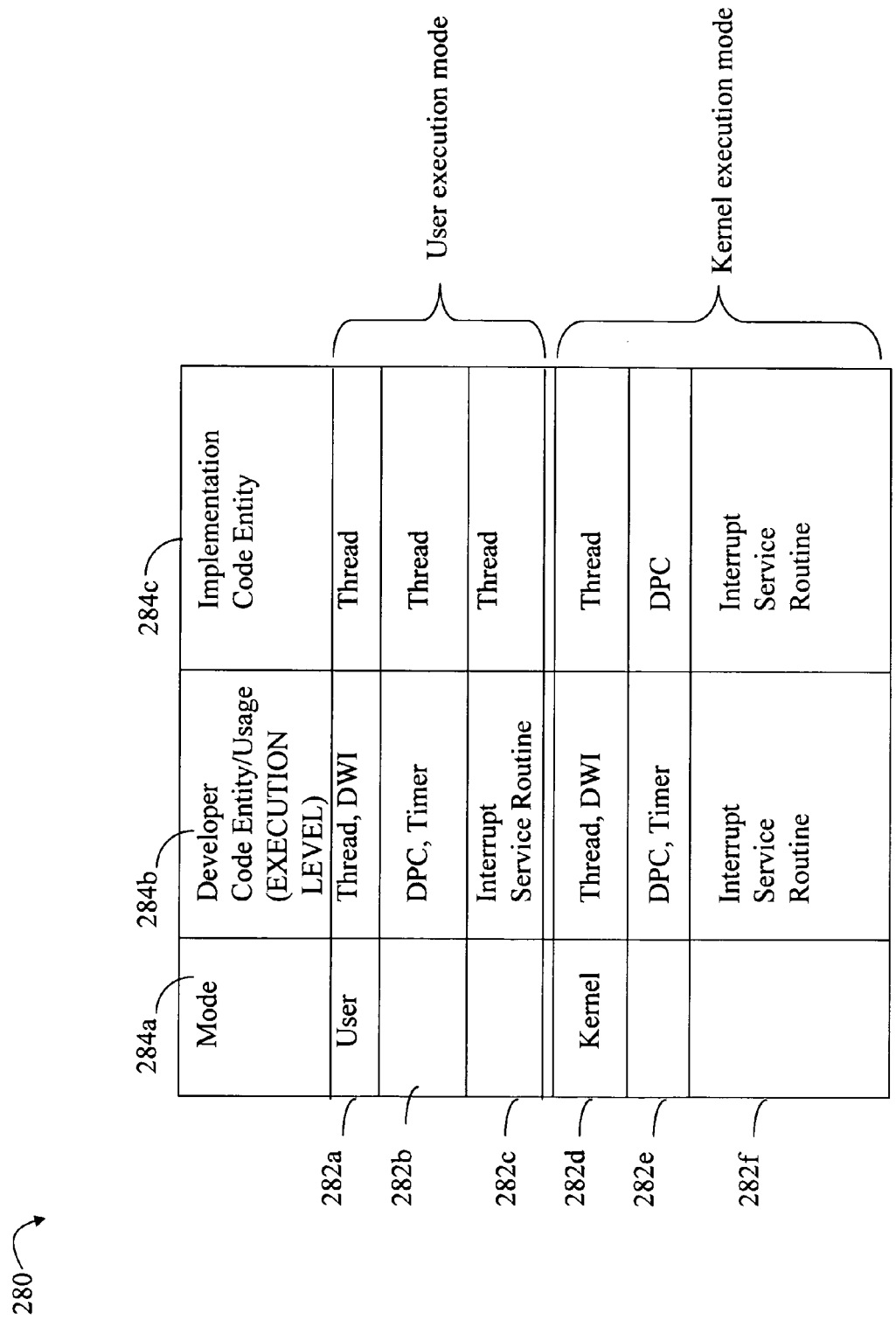
FIG. 2B is a table illustrating how different developer code entities may be implemented in an embodiment using the techniques herein in user mode and kernel mode.

Referring to FIG. 2B, shown is a table illustrating how an embodiment of the API may implement the different developer code entities for code executing in user and kernel mode. Table 280 includes a first column 284*a* listing one of user mode or kernel mode. Column 284*b* indicates the different developer code entities or usage code entities as defined and used in a code module. The developer code entities of 284*b* may be implemented by the API using the implementation code entities as indicated in 284*c* in order to provide a same set of functionality in both user and kernel mode. As known in the art, different developer code entities of 284*b* in user mode, such as the DPC and ISR, are typically entities only available to code that executes in kernel mode. In accordance with the techniques herein, a code module that calls the API in connection with operations for DPCs and ISRs may execute in user mode or kernel mode. In order to provide the foregoing functionality in user mode, one embodiment may include an API that simulates the objects and operations for DPCs and ISRs using threads when code executes in user mode. Rows 282a-c indicate how different developer code entities may be implemented in one embodiment of the API when code executes in user mode. Rows 282d-f indicate how different developer code entities may be implemented in one embodiment of the API when code executes in kernel mode. The way in which an embodiment implements the developer code entities 284b as indicated by 284c may vary depending in the underlying functionality available in the operating system and environment. It should be noted that element 284b indicates an execution level that may be associated with the body of code. The execution level indicates the developer code entity or usage.

Figure 2C:
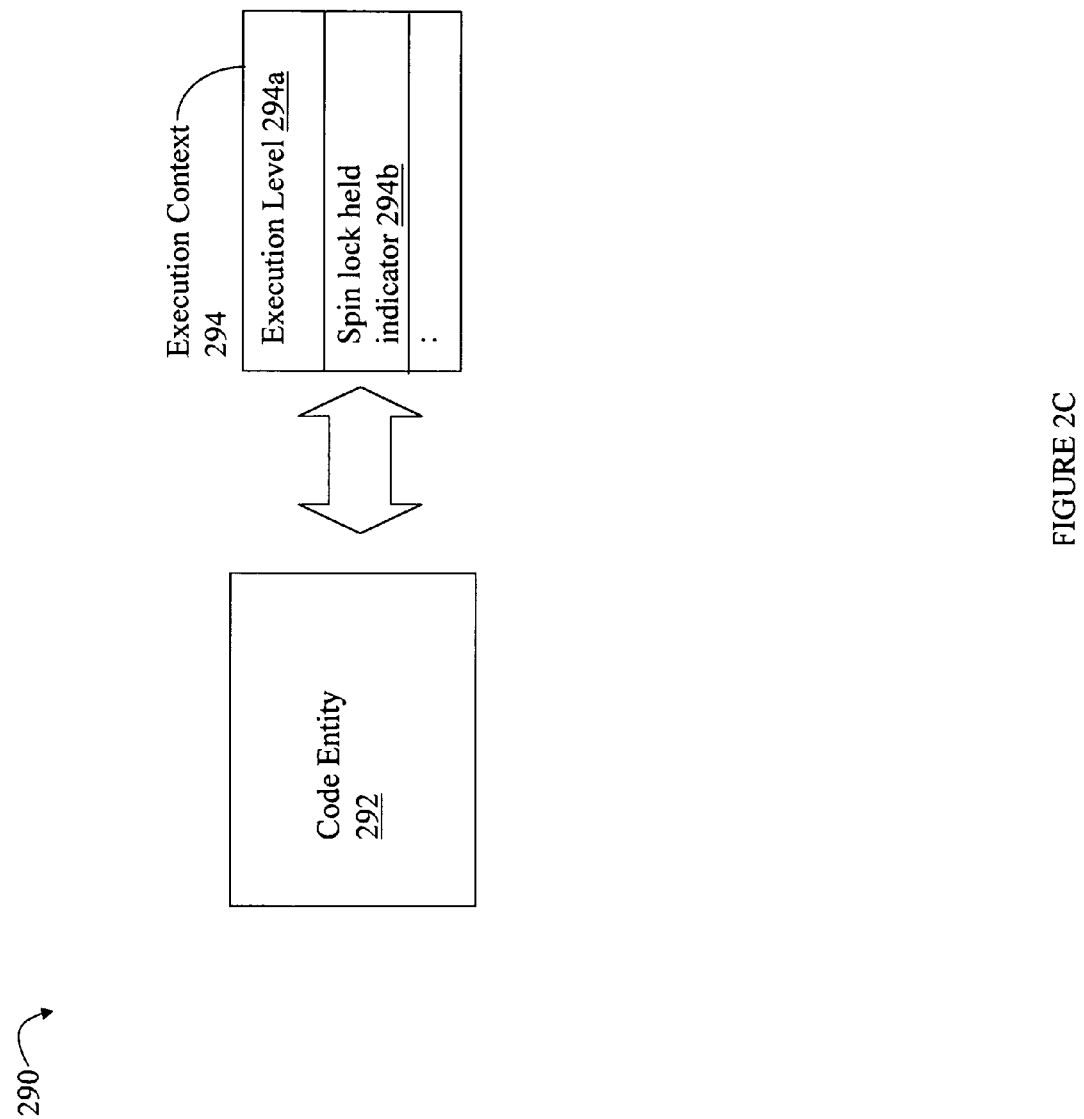
FIG. 2C is an example illustrating association of an execution context with a code entity.

Referring to FIG. 2C, shown is a representation of a runtime or an execution context 294 associated with a current execution state of a body of code (code entity 292) that may be used in an embodiment with the techniques herein. The execution context 294 may characterize aspects regarding the execution state of the code entity 292 at a point in time. As the code of 292 continues to execute, the execution context 294 may also accordingly change. The code entity 292 may have attributes associated with one of the rows of table 280. In one embodiment, the API may use the execution context 294 in connection with defining a set of criteria indicating allowable conditions or conditions as to when different scheduling and synchronization primitives are allowed to be performed. The execution context 294 may include an execution level 294a and a spin lock held indicator 294b. The execution level 294a may indicate a runtime execution context level associated with the code at a current execution point and correspond to the developer code entity as indicated in 284b of FIG. 2. The spin lock held indicator 294b may provide a runtime indication as to whether a spin lock is currently acquired at the current execution point. When a spin lock is successfully acquired during code execution and for the duration that the spin lock is held, the spin lock held indicator evaluates to true. If no spin lock is currently being held at an execution point, the spin lock held indicator evaluates to false. It should be noted that the spin lock held indicator may be implemented in an embodiment in a variety of different ways. In one embodiment, the indicator 294b may be implemented as a boolean or logical variable. An embodiment may also implement the indicator 294b using a counter which is incremented each time a spin lock is acquired.

It should be noted that although the execution context described herein includes an execution level and a spin lock held indicator, other information may be stored in an embodiment in connection with the execution context.

In one embodiment, the execution level 294a may be set to indicate one of the following in accordance with the usage of the code entity in the developer code module: a thread level, a deferred procedure call level or an interrupt level. The thread level indicates that the current execution point occurs in thread or a deferred work item developer code entity. The deferred procedure call level indicates that the current execution point occurs in a deferred procedure call or a timer developer code entity. The interrupt level indicates that the current execution point occurs in an interrupt service routine developer code entity. The execution level and the spin lock held indicator are appropriately updated and maintained by the API during execution of code that invokes the API. The execution level and the spin lock held indicator may be examined prior to performing scheduling and synchronization primitives corresponding to operations on objects as described herein and included in the API to determine whether to allow a requested operation.

The execution context 294 may be provided by the API for code that executes in user mode and kernel mode. The execution level 294a and spin lock held indicator 294b may be used in an embodiment described herein to define a set of criteria enforced for user space and kernel space to provide the same semantics for similar run time behavior when executing code in user and kernel space. It should be noted that code executing in user space does not typically have and apply the kernel-mode concepts of execution level and spin lock indictor as described herein. It should also be noted that the execution levels may vary with operating system. In accordance with the techniques herein, a common set of execution levels may be defined which can be supported across all environments to characterize the current execution level of code executing in any supported environment, in user mode and kernel mode.

An embodiment may utilize the defined execution levels of thread, DPC and interrupt as described above. The execution level associated with executing code may be set to thread level if the executing code is associated with a developer code entity that is a thread. When in the thread execution level, operations can be performed that block (e.g., cause the code to wait for a lock in a wait state) if no spin locks are held. Also, when in the thread execution level, the code is allowed to perform operations that wake up or signal other threads.

The execution level associated with executing code may be set to DPC level if the executing is associated with a developer code entity that is a DPC or a timer. When in the DPC execution level, operations cannot be performed that block (e.g., cause the code to wait for a lock in a wait state), and the code is allowed to perform operations that wake up or signal other threads.

The execution level associated with executing code may be set to interrupt level if the executing code is associated with a developer code entity that is an interrupt service routine. When in the interrupt execution level, code cannot perform operations that block (e.g., cause the code to wait for a lock in a wait state), and the code is not allowed to perform operations that wake up or signal other threads. However, the code may acquire a spin lock and can fire or queue a DPC for execution. It should be noted that a spin lock may be acquired by executing code having any of the defined execution levels herein. Also, executing code may queue a DPC when the executing code has any one of the defined execution levels herein.

As described herein, the spin lock held indicator may be used in combination with the execution level of executing code to determine what scheduling and synchronization primitives may be performed by calling code in the API. Prior to performing a requested operation corresponding to the scheduling and synchronization primitive, the API may include code which uses the execution context associated with the currently executing code to determine whether the requested operation is currently allowable. Criteria may be defined specifying conditions as to when requested operations may/may not be performed. The conditions may be expressed in terms of the execution context using the execution level and spin lock held indicator. For example, code having an associated thread execution level cannot enter a wait state (e.g. cannot perform an operation which may cause the code to block for failure to acquire a requested lock). As such, the code having a thread execution level and spin lock held indicator=true cannot perform a requested operation if the requested operation can cause the code to block for failure to acquire a lock.

It should be noted that as used herein, to say that code cannot perform an operation that blocks or "cannot block" means that the code is not allowed to perform an operation or scheduling and synchronization primitive that may cause the code to be placed in a blocking or wait state. It should noted that the foregoing is distinct from a busy wait state that may occur in connection with processing performed while waiting to acquire a spin lock. Code having an execution context in which the spin lock held indicator evaluates to true means that the code has acquired a spinlock and if another body of code tries to acquire the same spin lock, the other code will spin in a busy wait loop waiting for the spin lock (e.g., until it can acquire the spin lock).

The foregoing three possible execution levels may be utilized in an embodiment to indicate runtime behavior and associated semantics for code having a particular execution level. Each execution level may denote an execution priority level as follows from lowest execution priority level to highest: thread, DPC, and interrupt. Code having an associated execution level with an execution priority level may be preempted by another body of code having a higher execution level and associated execution priority level. Once the higher priority level code has completed, the originally preempted code can resume execution. In the embodiment described herein, the foregoing follows along with code that executes in both user mode and kernel mode. Thus, the execution level may also be used in connection with defining similar runtime behavior that is enforced when code executes in both user mode and kernel mode.

It should be noted that an embodiment implementing the different execution levels or developer code entities in user mode may optimize performance by assigning relative priority levels to user threads to simulate the different execution priorities for threads, DPCs and ISRs.

Figure 3:
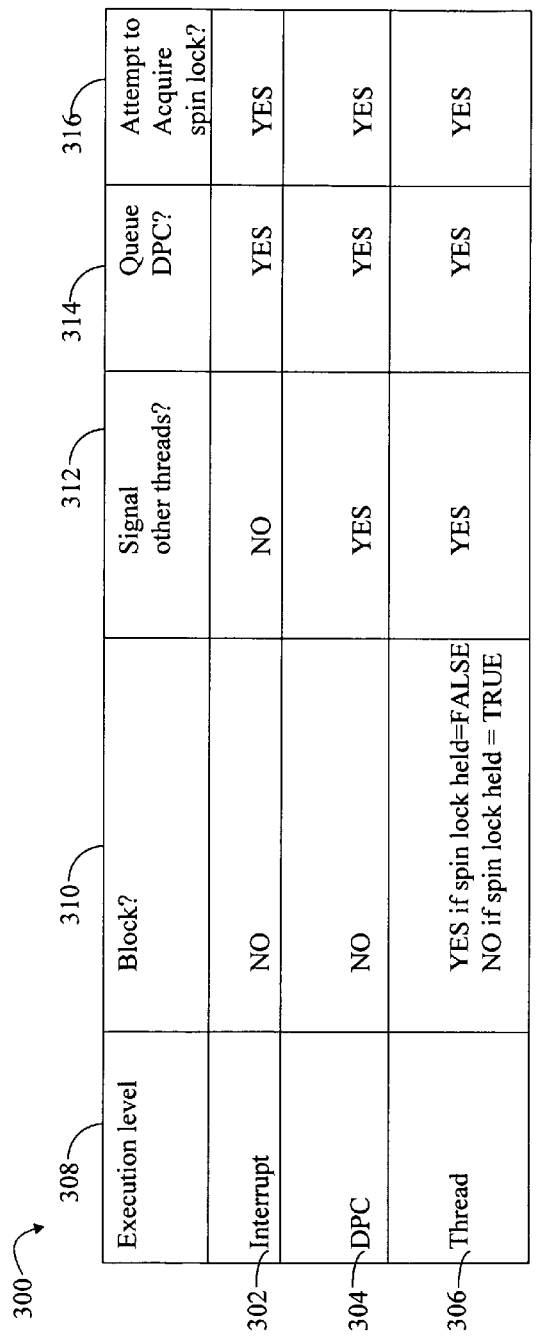
FIG. 3 is a table summarizing criteria that may be enforced by an API using the techniques herein for code executing in user mode or kernel mode on any supported platform.

Referring to FIG. 3, shown is an example summarizing when particular scheduling and synchronization primitives may be performed in an embodiment using the techniques herein. The example 300 summarizes whether a requested operation is allowable based on actions or possible resulting consequences of performing the requested operation. The example 300 indicates criteria that may be used to determine whether to perform a requested scheduling and synchronization primitive made by making a call to code in the API described herein. The API may include code which checks to determine whether the requested scheduling and synchronization primitive is allowable in accordance with the current execution context of executing code making the API call corresponding to the requested scheduling and synchronization primitive. Row 302 indicates the criteria for when to allow operations for an interrupt execution level. Row 304 indicates the criteria for when to allow operations for a DPC execution level. Row 306 indicates the criteria for when to allow operations for a thread execution level. It should be noted that the spin lock held indicator only affects the determination as to whether a thread can perform a requested operation that can result in blocking the code as may occur if a requested mutex lock is not available.

Based on the criteria set forth in rows 302, 304 and 306, code having an interrupt execution level, a DPC execution level, or a thread execution level with spin lock held indicator=YES or TRUE is not allowed to perform, for example: acquire_mutex_lock ( )—which attempts to acquire a mutex lock and otherwise causes the requesting code to block and enter a wait state; and semaphore_decrement ( )—which decrements a semaphore and causes the requesting code to block if the semaphore has an ending value less than zero. Code having an interrupt execution level is also not allowed to perform an operation which signals another code entity as may occur in connection with operations on condition variable objects and event objects. Code having a DPC execution level or a thread execution level, however, is allowed to perform the foregoing operation which may signal another code entity.

Columns 314 and 316 indicate that an operation can be performed which queues a DPC or attempts to acquire a spin lock when the executing code has any of the defined execution contexts.

It should be noted that an embodiment may allow variations of the foregoing illustrated in FIG. 3 to provide a further level of granularity in defining when operations described herein are allowable. For example, an embodiment may have two types of a spin lock—a non-interrupt disabling spin lock and an interrupt disabling spin lock. The embodiment may also have two spin lock held indicators, one for each of the foregoing spin lock types. A thread may be allowed to signal or wakeup another thread, such as in connection with semaphores, if holding a non-interrupt disabling spin lock but not if holding an interrupt-disabling spin lock.

Figure 4:
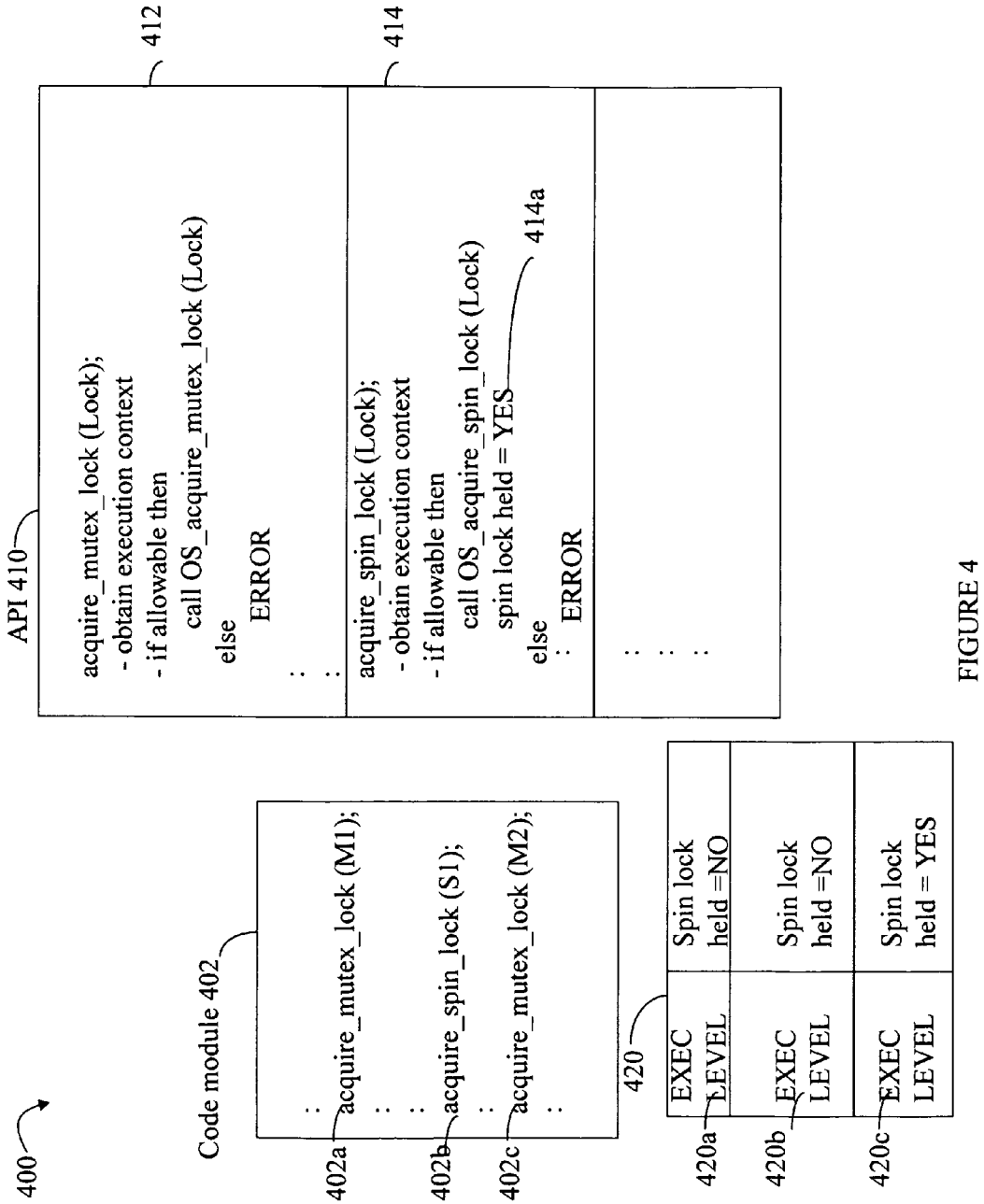
FIG. 4 is an example illustrating use of the techniques herein during code execution to implement the criteria of FIG. 3 in an embodiment.

Referring to FIG. 4, shown is an example illustrating how the criteria of FIG. 3 may be used in an embodiment of the API implementing the scheduling and synchronization primitives herein using the execution context. In the example 400, the code module 402 may include various calls into the API 410. Table 420 indicates the execution context as defined herein using the execution level and spin lock held indicator at different execution points in the module 402 as will be described in following paragraphs. Each of 420a-420c indicates a set of values as may be recorded in the execution context for the code module 402 at different points in time during execution thereof.

The code module 402 may include a first call at point 402a into the API 410 to the routine acquire_mutex_lock to attempt to acquire the mutex lock, M1. Execution of the call at 402a results in a transfer to code included in the API at the entry point indicated by 412. Element 412 indicates the processing that may be performed by the API code associated with attempting to acquire the mutex lock. The code of 412 obtains the current execution context from 420a. It should be noted that the first column of the table 420 indicates an execution level (EXEC LEVEL) and a corresponding spin lock held indicator (Spin lock=<value>). EXEC LEVEL generically indicates that in this example, the execution level may be any one of the 3 possible values described herein depending on the developer code entity including the code module 402. The code of the API 412 may obtain the current execution context as indicated in 420a for code module 402 and determine whether the requested scheduling and synchronization primitive is allowable in accordance with the current execution context. As described in connection with FIG. 3, the requested operation implemented by the API code of 412 may be performed only if the requested execution level is the thread execution level. If the requested operation is indicated as allowable, the code of 412 may perform a call to an underlying operating system primitive, OS_acquire_mutex_lock. Upon return from the operating system primitive, the code of 412 may update the execution context as needed. In this example, there is no change to the execution level and the spin lock held indicator does not need updating.

The code module 402 may include a second call at point 402b into the API 410 to the routine acquire_spin_lock to attempt to acquire the spin lock, S1. Execution of the call at 402b results in a transfer to code included in the API at the entry point indicated by 414. Element 414 indicates the processing that may be performed by the API code associated with attempting to acquire the requested spin lock. The code of 414 obtains the current execution context from 420b and then determines whether the requested scheduling and synchronization primitive is allowable in accordance with the current execution context. As described in connection with FIG. 3, the requested operation of 414 may be performed and the code of 414 performs a call to an underlying operating system primitive, OS_acquire_spin_lock. Upon return from the operating system primitive, the code of 414 may update the execution context as needed. In this example, the spin lock held indicator is updated in step 414a since the requested spin lock is acquired. Control may return to the code module 402. Element 420c may indicate the execution context for the code module 402 after execution of the API call 402b and also prior to execution of the API call at point 402c.

The code module 402 may include a third call at point 402c into the API 410 to the routine acquire_mutex_lock to attempt to acquire the mutex lock, M2. Execution of the call at 402c results in a transfer to code included in the API at the entry point indicated by 412. The code of 412 obtains the current execution context from 420c and determines whether the requested scheduling and synchronization primitive is allowable in accordance with the current execution context. As described in connection with FIG. 3, the requested operation of 412 may be performed only if the requested execution level is the thread execution level and the spin lock held indicator is NO or FALSE. In this example, the requested operation is indicated as not allowable and the code of 412 may result in an error indicating that the requested operation cannot be performed.

Referring to FIG. 4A, shown is an example illustrating storage of the execution context in an embodiment using the techniques herein. The example 450 illustrates that the execution context may be stored and accessed per thread 460 or per CPU 470. The particular times and conditions as to when the execution context is stored and retrieved on a per thread basis as in 460 or per CPU-basis as in 470 is described in following paragraphs. When the execution context including the execution level and spin lock held indicator is stored and retrieved on a per thread basis as illustrated in 460, the execution context may be stored in a thread-specific data area 462. In one embodiment, a thread-specific data 462 area may be associated with each thread object 452a. The thread-specific data area 462 may also be characterized as a thread's own local or private data area for use by the thread. In this example when the implementation code entity is a thread, the execution context 464 may be stored in the thread-specific data area 462. As the code of the thread executes, the execution context 464 may be accordingly updated. The thread-specific data area 462 may be accessible using a pointer included in the thread object 452a.

When the execution context including the execution level and spin lock held indicator is stored and retrieved on a per CPU basis as illustrated in 470, the execution context may be stored in a data area containing relevant information for each CPU. As an example, the current execution context for CPU 0 may be stored and retrieved using the kernel data structure of 470 by accessing the information in execution context 472. Element 472 represents a portion of the CPU-specific data for CPU 0 containing the current execution context for code executing on CPU 0.

As described herein and known in the art, code may be executed on a system having multiple CPUs. As an example in an embodiment having multiple CPUs, a thread implementation code entity may be executed on a first CPU, may be pre-empted, and then resume execution on the same or a different CPU. There are instance where the code may not, even if pre-empted, execute on a different CPU. In one embodiment described herein, if the implementation code entity is a DPC, ISR or a thread that has acquired a spin lock, the code entity may not be executed on different CPUs. In such cases where the code entity will not switch between CPUs (e.g., be executed on different CPUs), the structure of 470 may be used to set and retrieve the execution context.

In one embodiment, the execution context may be stored in thread-specific data as illustrated in 460 when the implementation code entity is a thread (as indicated in accordance with column 284c of FIG. 2B). The foregoing occurs when the code is included in a thread developer code entity executed in kernel mode and when the code is included in a developer entity that is a thread, DPC, or ISR executed in user mode. As described elsewhere herein, a developer's code module may include code for a DPC or ISR code body that is executed in user mode. In such a case, the API may use threads in user space to implement the foregoing (e.g., API may use user space threads to emulate DPC and ISR functionality).

In one embodiment, the execution context may be stored and accessed using a kernel data structure as illustrated in 470 providing information on a per-CPU basis when the implementation code entity is a DPC or ISR code body. The foregoing occurs when the code is included in a developer code entity that is a DPC or ISR executing in kernel mode. It should be noted that the execution context may be stored and retrieved using the structure of 470 when the currently executing code will not switch CPUs once execution has commenced. In contrast, when the currently executing code can switch CPUs, the execution context for the currently executing code is stored on a per-thread basis in the thread-specific data area as in 460.

It should be noted that in one embodiment, a thread developer code entity that has acquired a spin lock may not hold a spin lock across blocking operations (e.g., cannot perform an operation which may block the thread's execution). The embodiment may also not preempt the foregoing thread that holds a spin lock so as to allow any waiting thread on another processor to acquire the spin lock as soon as possible. In such a case where there is an execution level=thread for code running in kernel mode and a spin lock is held, the execution context information may be stored and retrieved from the data structure of 470 since the currently executed code will also execute on the same CPU. Alternatively, if no spin lock is held, the currently executing code running in kernel mode with execution level=thread may execute on different CPUs and the current execution context may be stored and retrieved using the thread-specific data of 460. It should also be noted that accessing the execution context using the structure of 470 may be more efficient than accessing the execution context using thread-specific data areas. As such, an embodiment may choose to utilize the structure of 470 over the thread-specific data area to obtain the current execution context when possible. In such an embodiment, the API code invoked to acquire a spin lock may update the data structure 470 when code that has execution level=thread acquires the spin lock. The current execution context may be retrieved from the thread's private data area by other code using the thread object as in 460 or using 470.

It should also be noted that although 470 illustrates execution contexts as being included in an entry for each CPU, a pointer may be maintained in the per-CPU entry which identifies or points to the thread's private data area, a location in the private data area containing the execution context, or a location of an execution context stored at a location other than in the foregoing private data area.

Figure 5A:
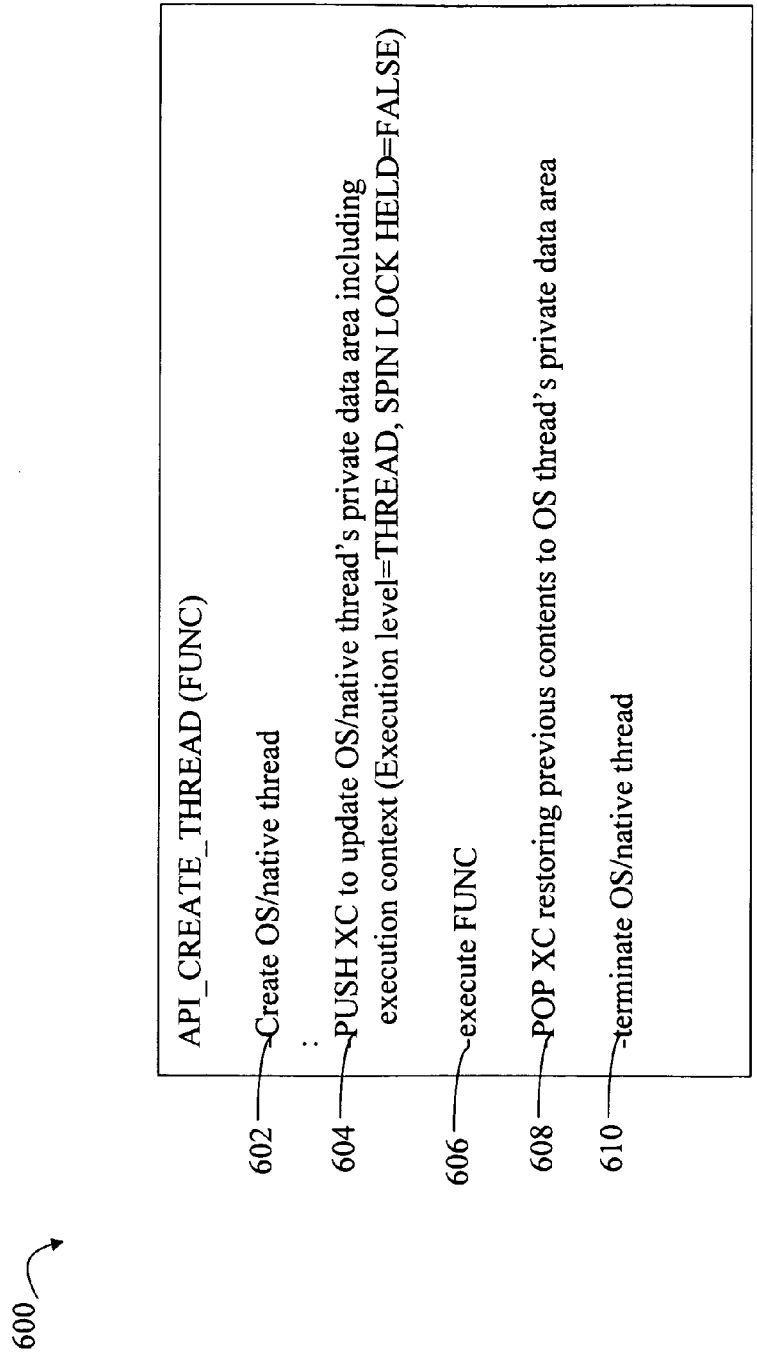
FIG. 5A is an example of logical steps that may be performed by code of the API in connection with thread creation and execution of a code entity having a thread execution level in user mode and kernel mode.

Referring to FIG. 5A, shown is an example illustrating steps that may be performed using an API routine to create a thread (e.g., API_CREATE_THREAD_WRAPPER) as may be called from developer code utilizing the techniques herein. The API of FIG. 5A may be invoked in connection with the thread developer code entity. The API includes code which implements the API thread on top of a native operating system (OS) thread by creating an OS thread in step 602. The thread object created identifies the code for FUNC (e.g., as included in the calling module and also indicated by parameter FUNC in this example) as the thread body of code. In step 604, the execution context for the thread is placed in the OS thread's private data area. In one embodiment, step 604 may include using any one of variety of different techniques which saves or preserves the existing contents of the OS thread's private data area prior to updating with the current execution context. The execution context of the OS thread as included in the private data area is updated to indicate a thread execution level and initialize the spin lock held indicator to false. At step 606, control is transferred to begin executing the thread body of code, FUNC. Once the thread code has completed, control returns and processing proceeds with step 608. In step 608, the previous contents of the OS thread's private data area may be restored. In step 610, the OS thread may be terminated. It should be noted that the thread's private data area may be preserved and restored to its previous state as just described in case another routine, previously in the current call chain, has stored information to the thread's private data area which step 604 may have overwritten. When the code of FUNC is executed as part of performing step 606, the spin lock held indicator may be updated when a spin lock is acquired and released. It should be noted that in one embodiment, the underlying OS function invoked in step 602 may be a user thread object if the code is executed in user mode, and may be a kernel thread object if the code is executed in kernel mode. The foregoing may be the case, for example, in connection with Unix operating systems and Windows NT operating systems. The example 600 represents the logical steps that may be implemented by the API for both user and kernel mode.

Figure 5B:
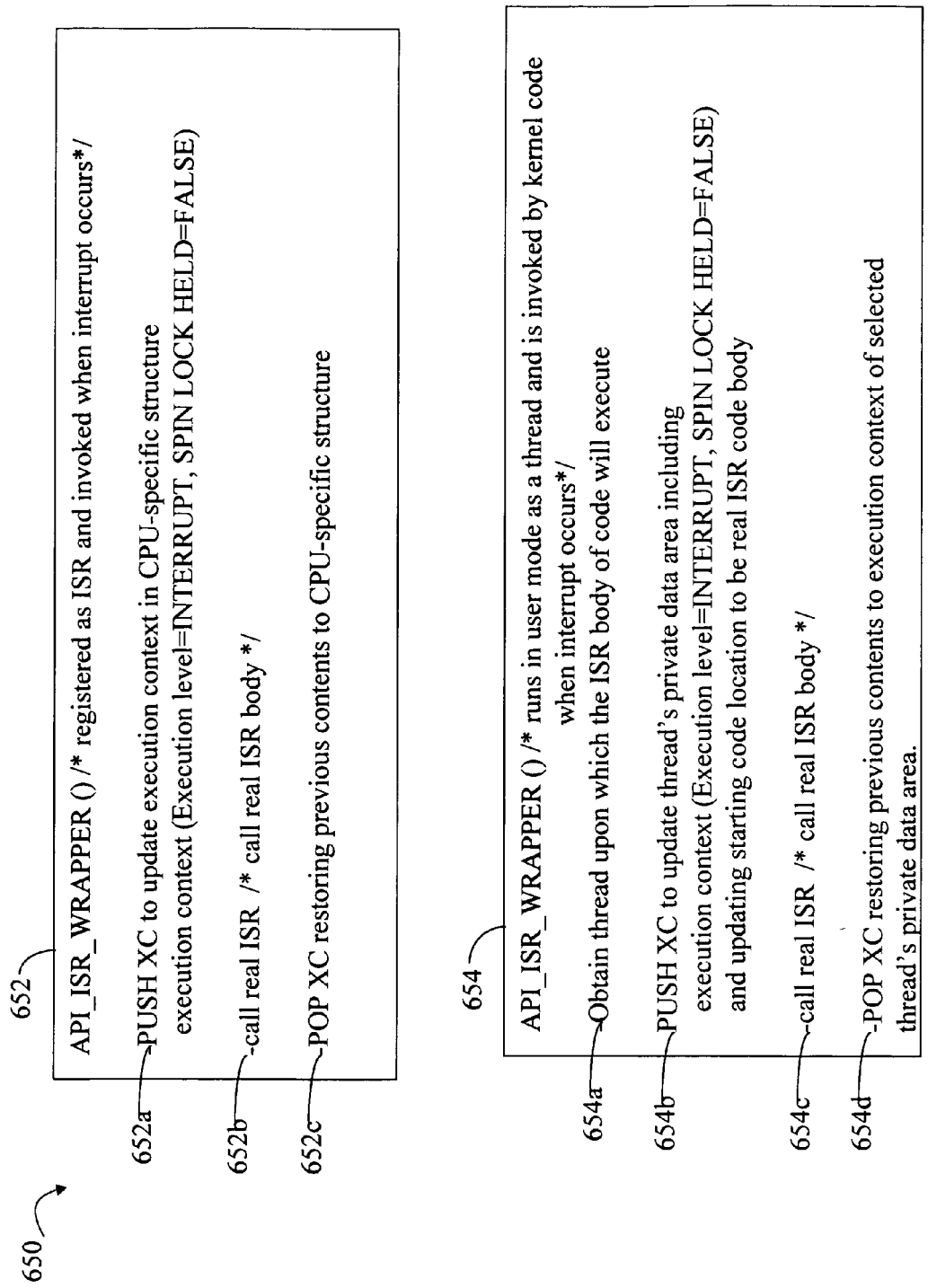
FIG. 5B is an example of logical steps that may be performed by code of the API in connection with execution of a code entity having an interrupt execution level in user mode and kernel mode.

Referring to FIG. 5B, shown is an example illustrating steps that may be performed using an API routine that may be invoked upon the occurrence of an interrupt. Element 652 may be used in connection with a user-defined ISR body of code when executed in kernel mode. In other words, 652 represents the logical steps that may be performed in an embodiment in connection with implementing an ISR developer code entity executed in kernel mode. Element 654 may be used in connection with a user-defined ISR body of code when executed in user mode (e.g., user mode interrupt service routines). In other words, 654 represents the logical steps that may be performed in an embodiment in connection with implementing an ISR developer code entity executed in user mode. In the example 650, the user-defined ISR code body comprising the interrupt handler or service routine is denoted as "real ISR". The API API_ISR_WRAPPER performs steps before and after invoking the real ISR.

Element 652 includes a first version of API code for API_ISR_WRAPPER which may be invoked upon the occurrence of an interrupt for the registered device. As known in the art, an interrupt service routine (ISR) may be registered for handling or servicing interrupts for particular devices. In connection with this example, the routine API_ISR_WRAPPER has been previously registered and is subsequently invoked upon the occurrence of an interrupt for the registered device. Upon invocation when an interrupt occurs, API_ISR_WRAPPER may be provided with sufficient information to transfer control to the location of the real ISR code body. In step 652*a*, the execution context of the CPU-specific structure 470 of FIG. 4A may be updated to identify an execution context with an interrupt execution level and a spin lock held indicator set to false. In step 652*b*, the real ISR may be invoked. Upon completion of the real ISR, control returns to 652 and processing continues with step 652*c*. In step 652*c*, the previous contents of the CPU-specific structure overwritten in step 652*a* may be restored.

Element 654 includes a second version of API code for API_ISR_WRAPPER which may be invoked upon the occurrence of an interrupt for the registered device. In connection with the techniques herein, the code of 654 may execute as a thread in user mode and be invoked by other code executing in kernel mode upon the occurrence of an interrupt. The other code executing in kernel mode which is initially notified upon the occurrence of the interrupt may be registered as with the operating system as the interrupt service routine. In step 654*a*, a thread is obtained that will be used to carry or execute the real ISR body of code. An embodiment may select a thread in step 654*a* using any one of a variety of different techniques. For example, step 654*a* may select an existing thread that is a dedicated worker thread, a worker thread selected from a pool of previously created worker threads, or may notify a waiting user space thread. In step 654*b*, information associated with the thread object selected from step 654*a* is modified so that the execution context of the thread's private data area indicates an interrupt execution level with a spin lock held indicator of false. In other words, the storage location of the selected thread's execution context is utilized or "borrowed" in step 654*b*.

Prior to modifying the thread's information in step 654*b*, the current thread information may be saved and then later restored in a fashion similar to that as described above in connection steps 604 and 608 of FIG. 5A In step 654*c*, the real ISR is called. Control then returns to API code 654 where step 654*d* is performed to restore the thread information previously overwritten in step 654*b*. Step 654*d* may include restoring the execution context in the thread's private data area, and any other information modified as a result of step 654*b*. It should be noted that other information associated with the selected thread from step 654*a* may be modified than as described herein as needed to call the real ISR code in step 654*c*. In connection with step 654*a*, an embodiment may also select a thread, for example, previously created using the API of FIG. 5A and which may have subsequently made another second API call requesting a resource. After acquiring the resource, code of the API for 654 may select the previously created step in 654*a*, modify the thread's information as described in 654*b*, execute the real ISR in 654*c*, restore the thread's information in 654*d* prior to returning to returning from the second API call. An example illustrating this in connection with an API call implementing the DPC developer code entity in user mode is described in following paragraphs.

Figure 6:
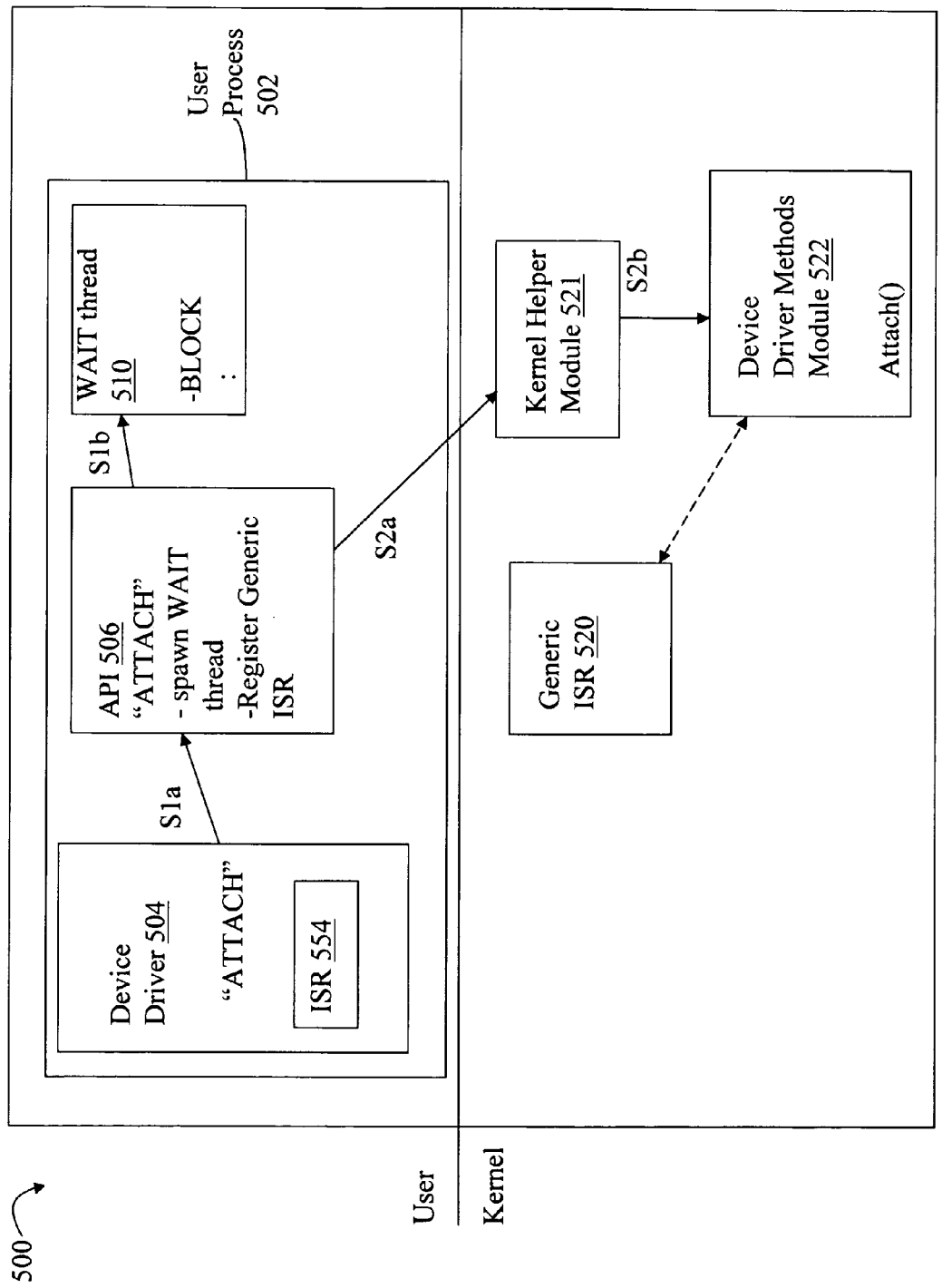
FIGS. 6-7 are an example illustrating execution of code having an interrupt execution level in user mode.

Referring now to FIG. 6, shown is an example of the techniques herein used in connection with implementing interrupts in user mode. FIG. 6 shows a first step in an exemplary use of an interrupt with device drivers. The example 500 illustrates using an attach operation to register the device driver in user mode. The example 500 illustrates a user mode device driver 504 executing an attach API call resulting in invoking API code 506 as illustrated by S1*a*. In this instance, the API code determines that the requested attach operation is performed as illustrated by S3*b* by first spawning wait thread 510 illustrated by S1*b*. The wait thread 510 includes code which executes an API call to block or stop execution of the thread 510 until signaled to resume execution by other code described in more detail in following paragraphs. The block operation may be an API call used for synchronizing execution between thread 510 and other code. In this instance, the execution of 510 will be resumed upon the occurrence of an interrupt for the device now being attached to. The block API call may result in a call to the kernel to place the wait thread 510 in a blocked execution state using scheduling and synchronization primitives in the underlying operating system. The API may utilize a kernel helper module 521 when issuing the kernel mode call to place the wait thread 510 in a blocked state. The module 521 may be used to facilitate making a call from user mode into kernel mode. After spawning the wait thread 510, the API 506 communicates with the kernel helper module 521 as illustrated by S2a to register with the operating system a generic ISR 520 in kernel mode as the ISR to be invoked upon the occurrence of an interrupt for the device. The module 521 then issues the attach request to the module 522 which results in registering the kernel mode generic ISR 520 to service any subsequent requests for the device. The generic ISR 520 may perform minimal work in connection with servicing the interrupt. The ISR 554 in the user mode device driver 504 will be invoked to perform processing to service the interrupt as described in FIG. 7.

Figure 7:
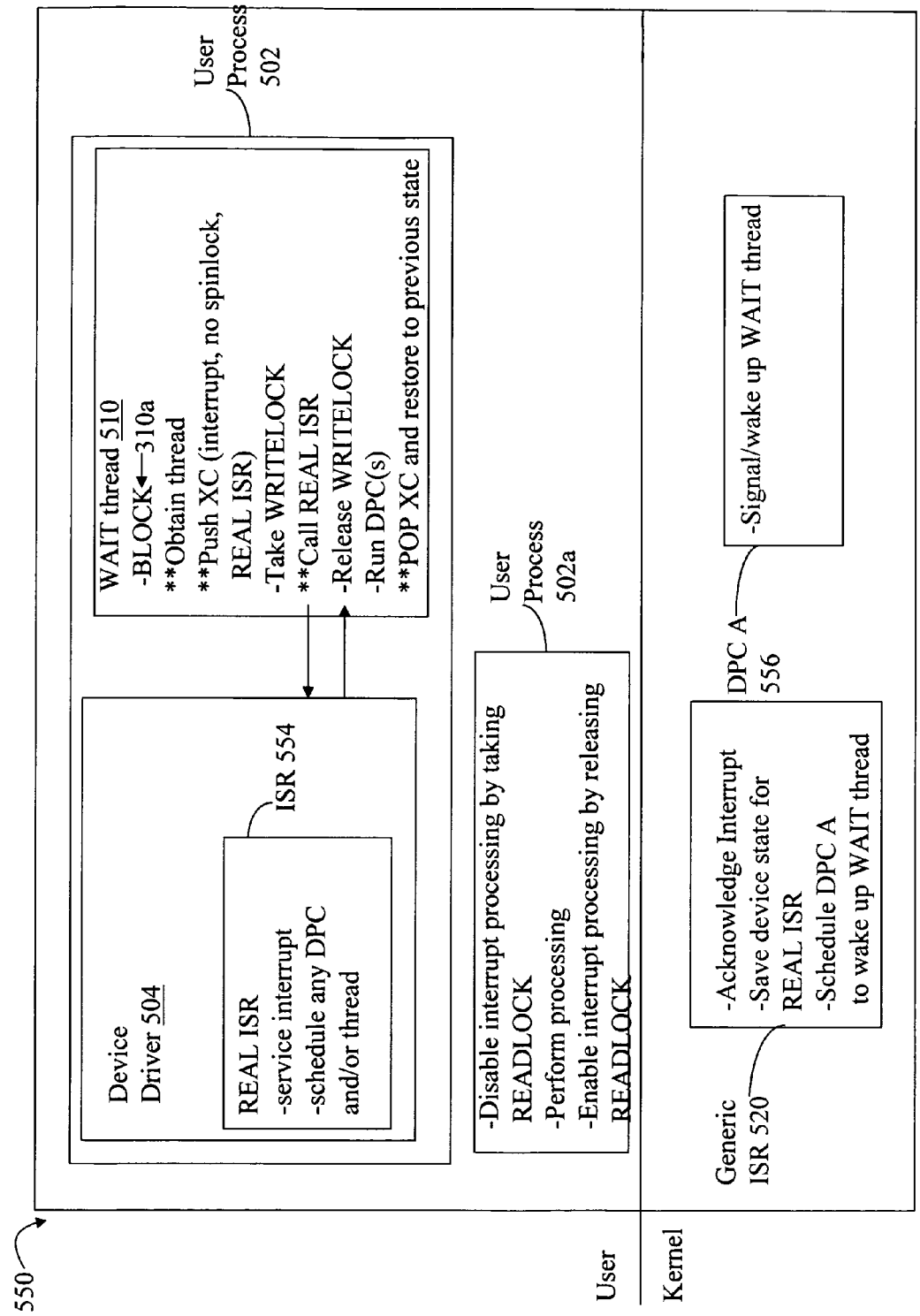

Referring to FIG. 7, shown is an example illustrating processing upon the occurrence of an interrupt for the user mode device driver attached in FIG. 6. As a first step, the generic ISR 520 is invoked. The generic ISR 520 performs minimal processing needed so that the real ISR, ISR 554, is able to service the request. The generic ISR performs processing to acknowledge the interrupt. This may include setting particular registers on the device. The generic ISR may also save the device state information regarding the interrupt to be processed later by the real ISR, ISR 554. As will be appreciated by those skilled in the art, such device state information may be needed by the ISR 554 in servicing the interrupt. The device state information may include, for example, data in the device's hardware registers indicating a reason for the interrupt such as an error, successful completion of a previous request, device time out, and the like. The generic ISR 520 then schedules or queues a DPC, denoted as DPC A 556, to wake up the WAIT thread 510. The generic ISR 520 may also be written using API calls such as a DPC API call. At some point, the DPC A 556 executes and signals or wakes up thread 510. The signaling results in the wait thread 510 being awakened and scheduled for execution by the processor. When the wait thread 510 resumes execution, it resumes execution following 310a, the point at which the wait thread's state was previously blocked. The wait thread 510 performs processing to invoke the real ISR, ISR 554, which services the interrupt. The steps performed by the wait thread 510 which are also described in connection with element 654 of FIG. 5 are denoted with a "*". The wait thread 510 obtains a thread object having associated information that is modified to carry out execution of the REAL ISR 554. The thread's execution context is modified to indicate an interrupt execution level with no spin locks held (=false). The thread information identifying the location of code to be executed is modified to identify the REAL ISR 554. The wait thread 510 uses a WRITELOCK synchronization operation. The WRITELOCK operation may be an API call which results in invoking the appropriate operating system primitives to implement a reader/writer lock. A reader/writer lock may have processes accessing the lock for read access or write access. Only a single process is allowed to access the lock for write providing exclusive access to the lock by the writer and not allowing any readers or other writers to access the lock. One or more processes may access the lock for read access when the lock is not already accessed for writing. A process cannot access the lock for write while there are any readers accessing the lock. A reader/writer lock may be a lock used to emulate enabling and disabling interrupts. When there are no readers accessing the lock, interrupts are enabled. When an interrupt occurs, other interrupts are disabled. When there are one or more readers accessing the lock, interrupts are disabled and the ISR 554 is not allowed to execute. Thus, the wait thread 510 does not invoke the ISR 554 until the WRITELOCK is available. Once the WRITELOCK is obtained, the real ISR code included in ISR 554 is invoked. The real ISR is the code that actually services the interrupt and then queues DPCs to complete the interrupt service processing, and/or otherwise has the DPC schedule threads to complete the processing. The ISR 554 may invoke an API call to perform the DPC operation.

The reader/writer lock may be logically implemented using a reader counter and a writer counter. A reader is able to access the lock if the writer counter is 0. A writer is able to access the lock if the reader counter and writer counter are both 0. Each operation to "take" a READLOCK increases the reader counter by 1 if there are no writers and otherwise waits until there are no writers. Each operation to "release" a READLOCK decreases the reader counter by 1. Each operation to "take" a WRITELOCK increases the writer counter by 1 if there are no readers and otherwise waits until there are no readers. Each operation to "release" a WRITELOCK decreases the writer counter by 1. The wait thread 510 may make API calls for the operations to take a WRITELOCK and release a WRITELOCK. Other threads of the user process 502 may make API calls for the operations to "disable interrupt processing" and "enable interrupt processing". In implementing the "disable interrupt processing" for code executing in user mode, the API may take a READLOCK by using a reader/writer lock or other operating system primitive. In implementing the "enable interrupt processing" for code executing in user mode, the API may release a READLOCK by releasing the native reader/writer lock or other operating system primitive. The API may perform the processing needed to utilize the underlying operating system primitives. In one embodiment, the API may include calls to "disable interrupt processing" and "enable interrupt processing". Each of these may be published APIs for use by code modules. Within the API, there may be unpublished routines which implement the READLOCK and WRITELOCK operations. As such, a code module may include a first published API call to "disable interrupt processing" or "enable interrupt processing". The published API call may result in other unpublished API calls for taking or releasing a READLOCK as appropriate. Each of these unpublished API calls may utilize the underlying operating system primitives, such as a reader/writer lock or other primitive, that may vary with the underlying operating system. The wait thread 510 in this example may utilize other unpublished APIs for taking and releasing a WRITELOCK. Each of these unpublished API calls may also utilize the underlying operating system primitives, such as a reader/writer lock or other primitive, that may vary with the underlying operating system. The foregoing describes the behavior with respect to the API for user mode code. If code module 502, for example, is executed in kernel mode, the code module may include the same published API calls to "enable interrupt processing" and "disable interrupt processing". However the forgoing published API calls when made from code executing in the kernel mode may directly invoke the operating system or hardware primitives to directly manage enabling/disabling the interrupt state.

In one embodiment herein, the ISR 554 in user mode runs at a real-time priority level so that it is not pre-empted and is scheduled to execute prior to other user space code so that the ISR 554 executes with a priority substantially the same as the ISR which runs in kernel mode and the generic ISR 520. For the user space code in FIG. 7, the ISR 554 may have a higher priority than the emulated DPC call for user mode, and the emulated DPC may have a higher priority than other user processes and threads executing in user mode. In user mode, the API may implement the DPC functionality by scheduling a user mode thread for execution having a priority substantially the same as a DPC included in an operating system for kernel mode execution.

Once the real ISR code of ISR 554 completes, control is returned to the wait thread 510 which then issues an API call to run queued DPCs. The API call to run the DPCs in user mode causes execution of those DPCs associated with the same processor on which the wait thread 510 is currently executing. The step of the wait thread 510 to run the DPCs causes the processor to execute the DPCs of the processor on which the wait thread is executing prior to other DPCs or other code having the same priority. The foregoing step of the wait thread 510 to run the DPCs may be optionally performed in an embodiment. As a last step, the wait thread 510 restores the execution context (denoted as POP XC).

It should be noted that for the user space emulated DPC operation, whenever user space code performs a DPC call, this results in the API scheduling a DPC user-mode thread for execution on the same CPU as the requesting thread or code module. In other words, the emulated DPC operation queues a DPC thread for execution on the same CPU as the thread making the DPC call. The foregoing is made with reference to an embodiment in which there are multiple storage system processors so that the emulated DPC operation in user mode may result in scheduling a DPC user-mode thread with a relative priority as indicated above on any one of the data storage system processors. However, in one embodiment, the DPC thread is scheduled for execution on the same processor as that of the requestor or thread performing the DPC call.

It should be noted that the reader/writer lock is used to ensure that the ISR 554 and other code that may share the same data structures as the ISR 554 do not execute at the same time. In other words, the ISR 554 needs exclusive access to data structures used in connection with performing I/O operations for the device. For example, one of the data structures may be a buffer used to store data in connection with performing the I/O request for the device. Other threads may also be executing which utilize the same data structures. One or more of these other threads may be able to simultaneously access the data structures. The reader/writer lock may be used to implement the state of interrupt disable/enable in accordance with kernel semantics. To further illustrate, user process 502*a* may include code which accesses the same data structures as ISR 554. Prior to performing processing using these data structures, the process 502*a* may take a READ-LOCK to disable interrupt processing. If the wait thread 510 tries to take the WRITELOCK while 502*a* has a READ-LOCK, wait thread 510 will have to wait until 502*a* issues a release READLOCK indicating that there are no more readers.

It should be noted in the foregoing that each code portion in user mode and kernel mode may utilize APIs to implement the functionality described. The API may perform the necessary processing to implement the requested operation by invoking the helper modules as necessary and utilizing underlying primitives of the operating system.

Additional details regarding an ISR that may execute in kernel mode and user mode in accordance with the techniques herein are described in U.S. patent application Ser. No. 11/824,506, filed Jun. 29, 2007, entitled TECHNIQUES FOR USE WITH DEVICE DRIVERS IN A COMMON SOFTWARE ENVIRONMENT, which is incorporated by reference herein.

Figure 8:
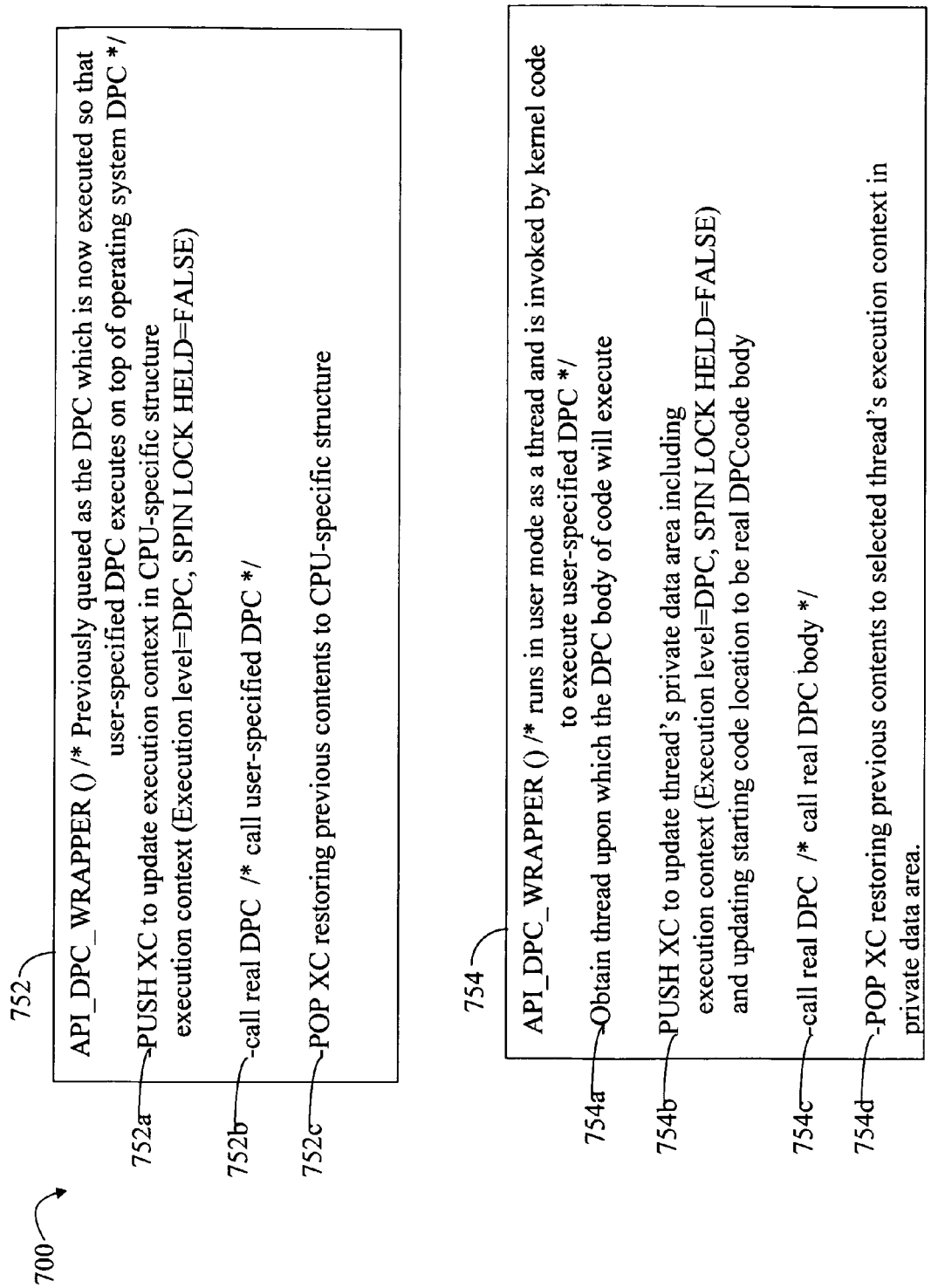
FIG. 8 is an example of logical steps that may be performed by code of the API in connection with execution of a code entity having a DPC execution level in user mode and kernel mode.

Referring to FIG. 8, shown is an example illustrating steps that may be performed using an API routine to execute a user-specified DPC code body. Element 752 may be used in connection with a user-defined DPC body of code when executed in kernel mode. In other words, 752 represents the logical steps that may be performed in an embodiment in connection with implementing a DPC developer code entity executed in kernel mode. Element 754 may be used in connection with a user-defined DPC body of code when executed in user mode. In other words, 754 represents the logical steps that may be performed in an embodiment in connection with implementing a DPC developer code entity executed in user mode. In the example 750, the user-defined DPC code body is denoted as "real DPC". The API API_DPC_WRAPPER performs steps before and after invoking the real DPC.

Element 752 includes a first version of API code for API_DPC_WRAPPER which may have been previously queued as the DPC which is now being invoked so that the user-specified DPC code body can run. In step 752*a*, the execution context of the CPU-specific structure 470 of FIG. 4A may be updated to identify an execution context with an DPC execution level and a spin lock held indicator set to false. In step 752*b*, the real DPC may be invoked. Upon completion of the real DPC, control returns to 752 and processing continues with step 752*c*. In step 752*c*, the previous contents of the CPU-specific structure overwritten in step 752*a* may be restored.

Element 754 includes a second version of API code for API_DPC_WRAPPER which may be invoked to execute the user-specified DPC code body. In connection with the techniques herein, the code of 754 may execute as a thread in user mode and be invoked by other code executing in user mode. The other code executing in user mode may be scheduled as a DPC and executed at a later point. During execution, the other code may signal the user mode thread 754 causing the real DPC to be executed. In step 754*a*, a thread is obtained that will be used to carry or execute the real DPC body of code. An embodiment may select a thread in step 754*a* using any one of a variety of different techniques as described elsewhere herein in connection with step 654*a* of FIG. 5B. In step 754*b*, information associated with the thread object selected from step 754*a* is modified so that the execution context of the thread's private data area indicates a DPC execution level with a spin lock held indicator of false. Prior to modifying the thread's information in step 754*b*, the current thread information may be saved and then later restored in a fashion similar to that as described above in connection steps 604 and 608 of FIG. 5A In step 754*c*, the real DPC is called. Control then returns to API code 754 where step 754*d* is performed to restore the thread information previously overwritten in step 754*b*. Step 754*d* may include restoring the execution context in the thread's private data area, and any other information modified as a result of step 754*b*. It should be noted that other information associated with the selected thread from step 754*a* may be modified than as described herein as needed to call the real DPC code in step 754*c*.

In connection with both 752 and 754, as well as in other API code described herein, an embodiment may perform other processing to examine the execution context at appropriate points in time and determine whether the execution context has a proper or expected state. For example, after performing 752c and 754d, an embodiment may perform a sanity check regarding the state of the previously restored execution context. An embodiment may, for example, check to see whether the spin lock held indicator is zero.

Figure 9:
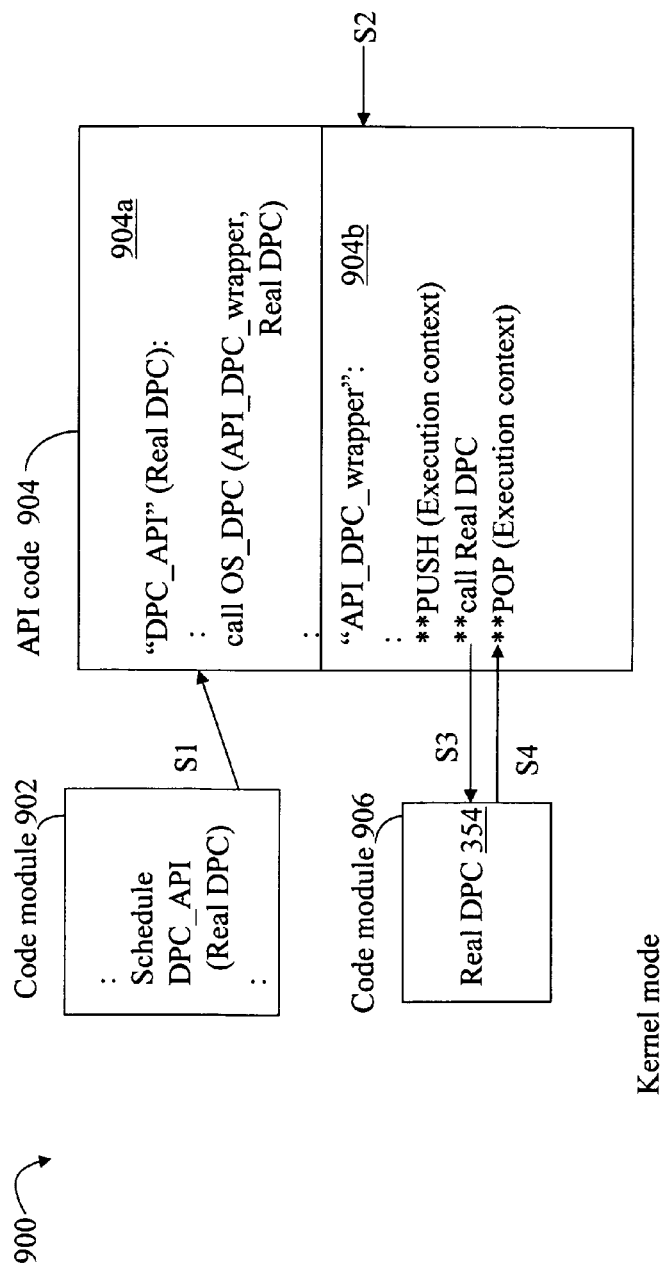
FIG. 9 is an example illustrating execution of code having a DPC execution level in kernel mode.

Referring to FIG. 9, shown is an example illustrating implementation of a DPC developer code entity executed in kernel mode. The example 900 includes code modules 902 and 906 and API code 904. The first code module 902 performs an API call, DPC_API, to schedule a DPC, "Real DPC" 354, having code included in module 906. The call DPC_API from 902 into the API portion 904a is illustrated by S1. API code 904a performs an operating system call to queue API_DPC_wrapper as a native or operating system DPC for execution. Element 904b is the code portion for API_D-PC_wrapper and includes the logic of 752 (denoted by **) from FIG. 8. At some later point in time, API_DPC_wrapper executes, saves the current CPU execution context and replaces with the execution context for the DPC execution level (denoted as PUSH operation), calls the REAL DPC (S3) and then returns (S4) where the execution context is restored (denoted as POP operation).

Figure 10:
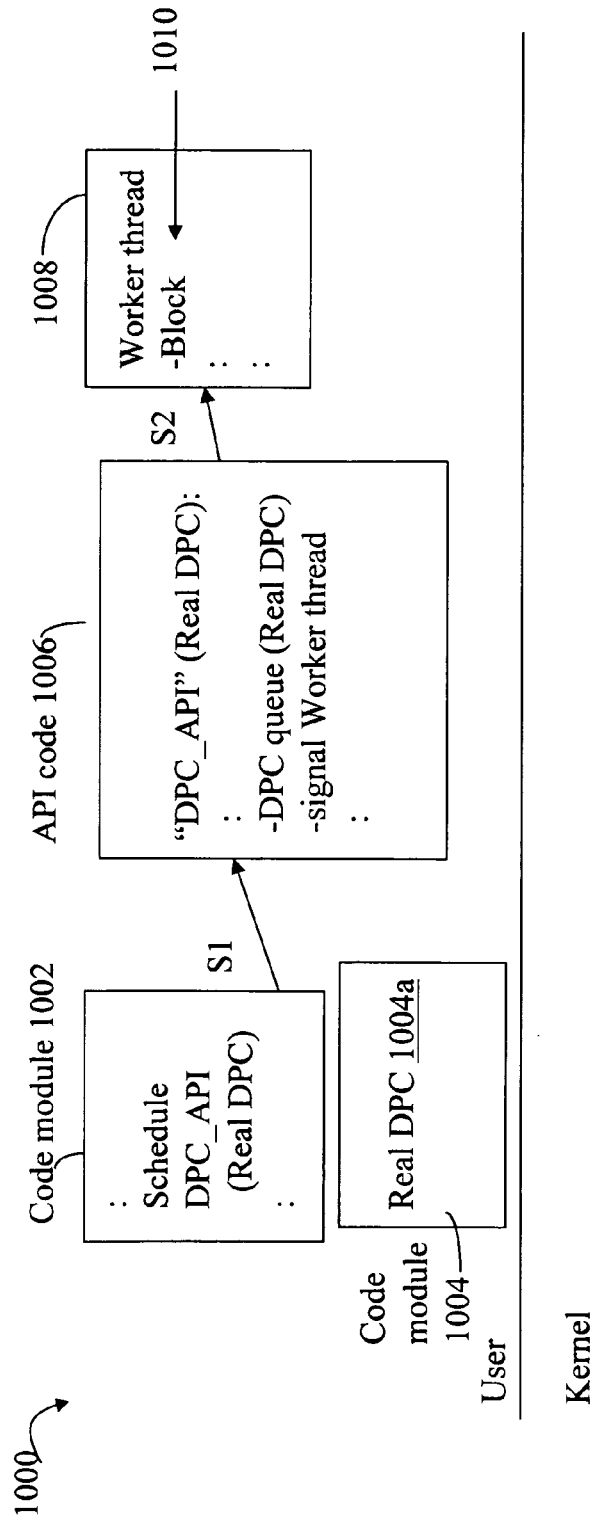
Figure 11A:
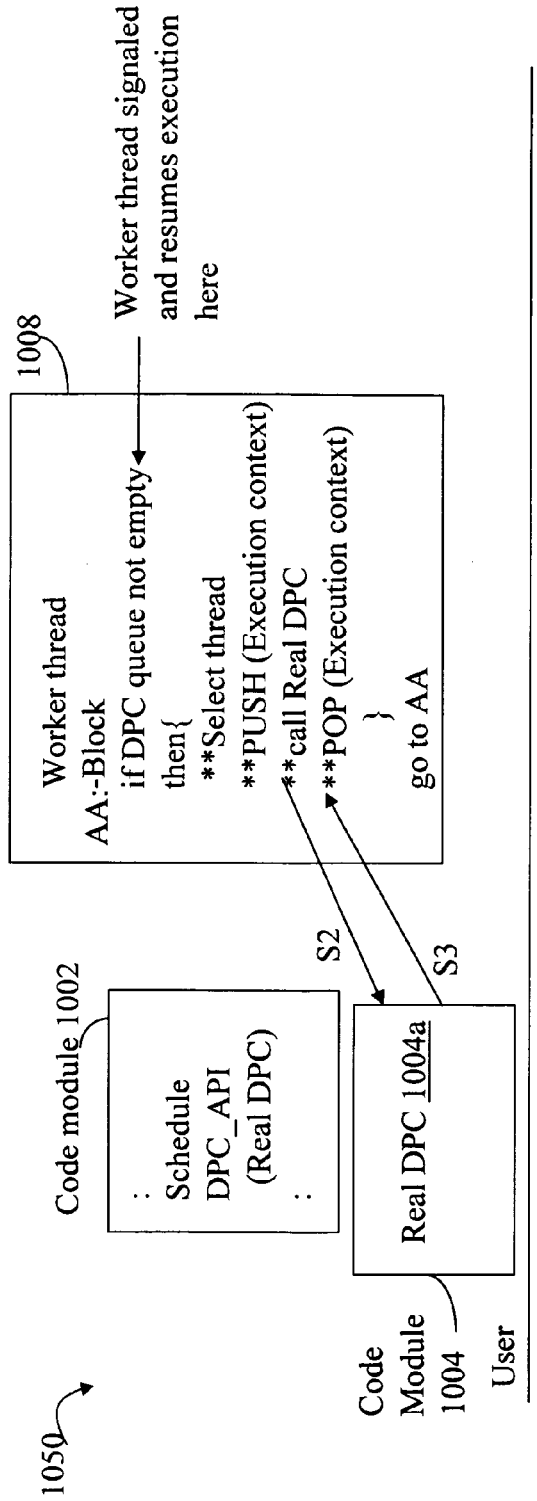

Referring to FIGS. 10 and 11A, shown is an example illustrating implementation of a DPC developer code entity executed in user mode. The example 1000 includes code modules 1002 and 1006, API code 1004 and worker thread 1008. The first code module 1002 performs an API call, DPC_API, to schedule a DPC, "Real DPC" 1004a, having code included in module 1004. The call DPC_API from 1002 into the API is illustrated by S1. API code 1006 queues the Real DPC on a queue. The queue may be implemented as a user mode data structure including entries for the different scheduled user mode developer DPC code entities to be executed. Each entry may include information identifying the location of the Real DPC code in the module 1004. The code of 1006 may then signal (S2) a worker thread 1008 for execution. The worker thread 1008 may include code which remains in the blocked state 1010 until signaled by the API code 1006 for the DPC_API.

FIG. 11A illustrates execution flow once the worker thread 1008 is signaled and resumes execution. If DPC queue is not empty, then the worker thread 1008 selects a thread for use in connection with executing the Real DPC as described above. The selected thread may be the worker thread itself or another thread whose execution context storage location is borrowed in connection with storing the execution context for the Real DPC. In an embodiment where the selected thread is the worker thread 1008 itself, the worker thread 1008 performs processing inline to save the selected thread's execution context and replaces it with the execution context for the DPC (denoted PUSH). The worker thread calls the Real DPC (S2) which executes using the DPC execution context and then returns to the worker thread which restores the selected thread's previous execution context (denoted POP). The worker thread then goes to sleep or blocks until signaled again to process any queued DPCs. It should be noted that the worker thread 1008 may process one or more queued DPCs. The logical steps performed by the worker thread 1008 as previously described in connection with 754 of FIG. 8 are denoted by "**". The worker thread 1008 and the code of the Real DPC 1004a may be executed with a relative priority level higher that of code having a thread execution level but less than the execution priority of code having an interrupt execution level.

In an embodiment in which the selected thread (denoted select thread) is not the worker thread 1008 itself but is rather another thread, the selected thread may perform the steps denoted in FIG. 11A as: Select thread, PUSH (Execution context), call Real DPC, and POP (Execution context).

Figure 11B:
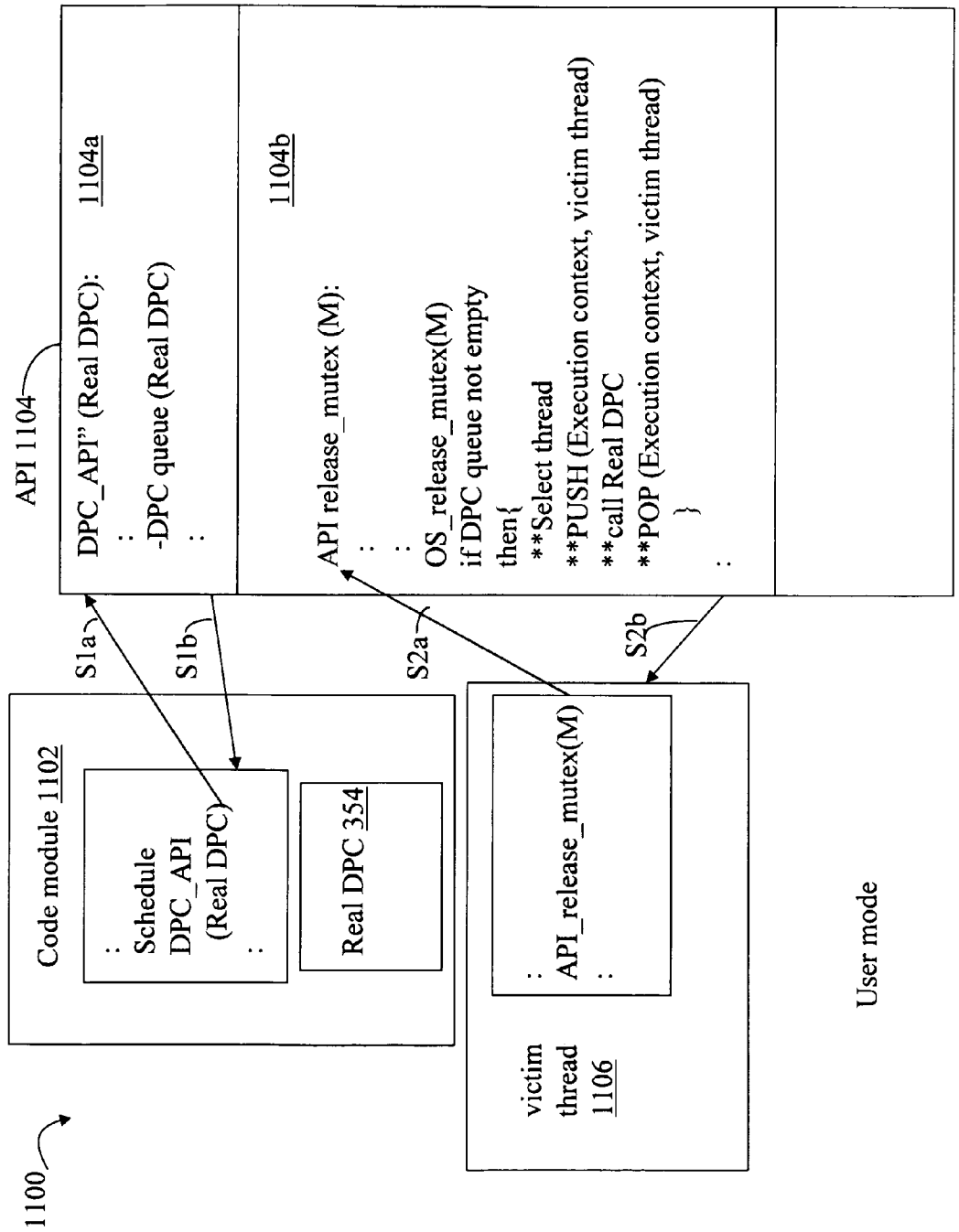
FIG. 11B is an example illustrating a technique that may be used in connection with selection of a thread and execution of code having a DPC execution level in user mode.

Referring to FIG. 11B, shown is an example illustrating another technique that may be used in connection with implementation of user mode DPCs. The example 1100 illustrates another technique used to select a thread used to carry out the execution of the Real DPC. As described herein, in order to execute the Real DPC, the storage area of the selected thread's is borrowed by replacing the selected thread's execution context with the execution context for the Real DPC (e.g., execution level=DPC, spin lock held=NO). The example 1100 includes code module 1102, API 1104, and victim thread 1106. S1a illustrates the call from module 1102 to the API code 1104a to schedule the Real DPC. The code 1104a queues the Real DPC to the user mode DPC queue structure as described previously in connection with FIG. 10, and then returns to the user code. At some later point in time, another code module, such as victim thread 1106, may perform another API call for any one of a variety of different operations. This example illustrates 1106 as performing an API call, API_release_mutex, to release the mutex lock M. However, an embodiment may utilize the techniques herein with any one or more other API calls. The foregoing API call by 1106 transfers control to code 1104b of the API which executes a native operating system call, OS_release_mutex, to release the mutex lock M. After the mutex lock is released, the code of 1104b determines whether the DPC queue is empty. If not, processing is performed to call the Real DPC as described previously in connection with 754 of FIG. 8, (denoted **). In this example, the thread selected is the victim thread itself and the victim thread's own execution context may be modified as described above to facilitate execution of the Real DPC prior to returning (S2b) to the victim thread 1106.

Figure 12:
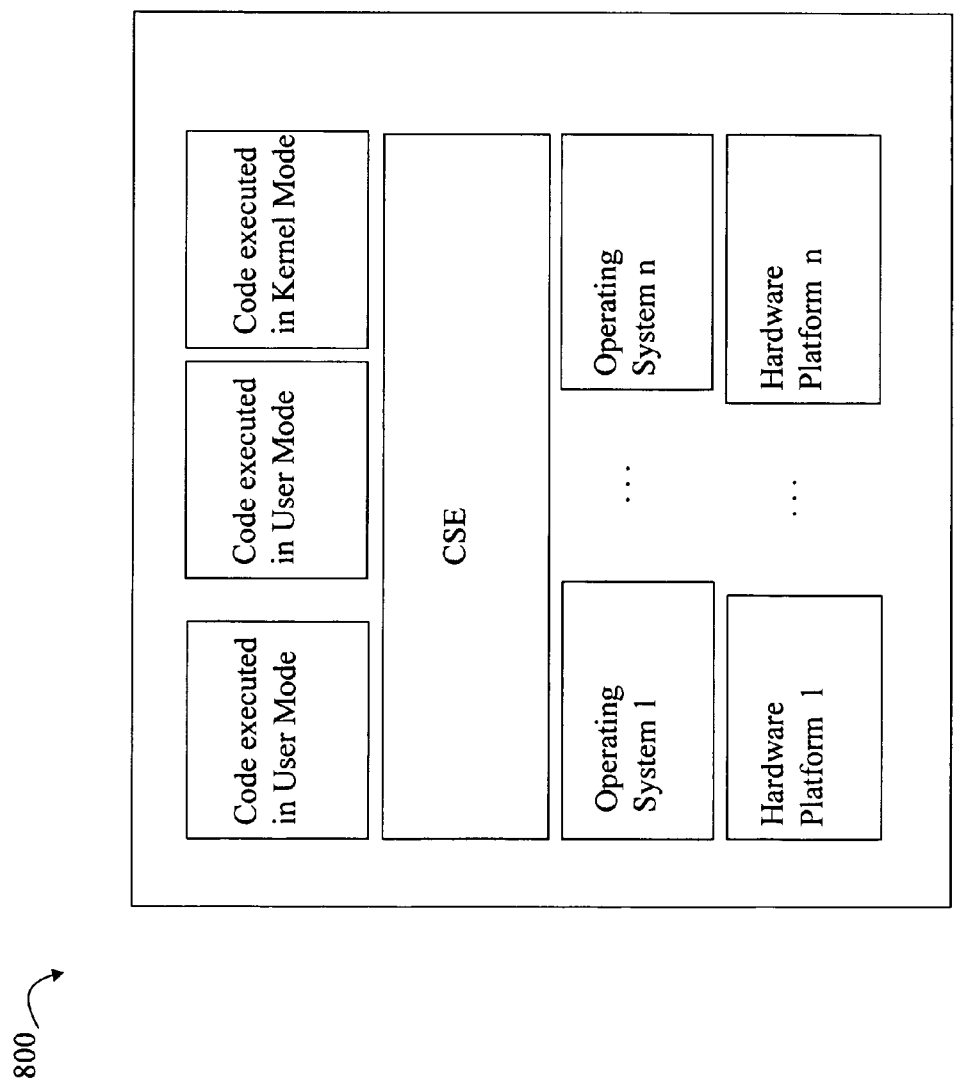
FIG. 12 is an illustration of the different operating systems and hardware platforms that may be included on a data storage system for use with the techniques herein.

Referring now to FIG. 12, shown is a representation illustrating the relationship of the common software environment (CSE) components to other components of the data storage system. In the example 800, the CSE includes the API, and other infrastructure code used to interface code of the API to other operating system components. The CSE may isolate any code in user space (code executing in user mode) or kernel space (code executing in kernel mode) above the CSE from dependencies in the operating system or hardware platform. Furthermore, code writing using the API of the CSE may be executed in either user or kernel mode as illustrated herein.

As will be appreciated by those skilled in the art, the techniques herein may be used for existing code as well as newly developed code. For existing code, the platform specific calls may be determined and replaced with appropriate API calls. The API code may be modified to provided the necessary support for any additional platform. Similarly, new code may be developed using the API calls which may utilize the platform specific primitives while isolating the code from these platform dependencies.

It should be noted that a code module making calls into the API in accordance with techniques herein may use a first version of the API code when executing in user mode and a second version of the API code when executing in kernel mode by linking to the appropriate version. In other words, the code module makes the same API call (e.g., same defined interface) when executing in user mode and kernel mode so that the same code module can be executed in user mode and kernel mode without modification. However, the body of code included in the API which is executed as a result of the API call may vary in accordance with whether executing in user mode or kernel mode.

Using the techniques herein, an API may be used to provide kernel-mode semantics when implementing and providing scheduling and synchronization primitives to code that executes in user mode and across multiple supported environments.

An embodiment may implement the techniques herein using code executed by a computer processor. For example, an embodiment may implement the techniques herein using code which is executed by a processor of the data storage system. As will be appreciated by those skilled in the art, the code may be stored on the data storage system on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a data storage system processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of executing code performing one or more operations corresponding to scheduling and synchronization primitives, the method comprising:
    performing, by said code during execution of said code, a call using an application programming interface requesting a first of said operations corresponding to one of said scheduling and synchronization primitives; and
    determining, during runtime in response to said call, whether to perform said first operation, said determining using a set of one or more criteria indicating conditions as to when said scheduling and synchronization primitives are allowed to be performed, said one or more criteria being determined in accordance with a plurality of different platforms, if said determining determines that said first operation is allowable and said first operation is to be performed, then said code is allowed to be executed on each of said different platforms in a privileged execution mode and a non-privileged execution mode, wherein first code of the application programming interface provides a same set of functionality for both the privileged execution mode and the non-privileged execution mode, said same set of functionality including functionality in connection with a deferred procedure call and an interrupt service routine, wherein the first code of the application programming interface simulates functionality in connection with any of a deferred procedure call executed in the non-privileged execution mode and an interrupt service routine executed in the non-privileged execution mode using threads executed in the non-privileged execution mode.

2. The method of claim 1, wherein said conditions indicate allowable execution contexts using an execution level and a spin lock held indicator, said execution level indicating a runtime execution context level associated with said code at a current execution point, said spin lock held indicator providing a runtime indication as to whether a spin lock is currently acquired at said current execution point.

3. The method of claim 2, wherein said execution level is set to one of a plurality of execution level values, said plurality of execution level values including a thread level, a deferred procedure call level and an interrupt level, said thread level indicating that said current execution point corresponds to a body of code associated with a thread or a deferred work item, said deferred procedure call level indicating that said current execution point corresponds to a body of code associated with a deferred procedure call or a timer, and said interrupt level indicating that said current execution point corresponds to a body of code associated with an interrupt service routine.

4. The method of claim 3, wherein said code includes a first call using said application programming interface to perform one of said operations in connection with a mutual exclusion lock, a spin lock, a condition variable, a semaphore, and an event, and said application programming interface provides an interface to instantiate an object corresponding to a thread, a deferred procedure call, or an interrupt service routine.

5. The method of claim 2, further comprising:
    updating said execution level and said spin lock held indicator during execution of said code to reflect a current runtime execution state of said code.

6. The method of claim 2, wherein said execution level and said spin lock held indicator are examined prior to performing said first operation to determine whether to perform said first operation.

7. The method of claim 1, wherein each of said plurality of different platforms includes at least one of an operating system or hardware which is different from another of said plurality of different platforms.

8. The method of claim 1, wherein said application programming interface provides an interface to a code module that performs said one or more operations when said code executes in a non-privileged that is user mode, and performs said one or more operations when said code executes in a privileged mode that is kernel mode.

9. The method of claim 1, wherein, if said code executes in a user mode that is said non-privileged execution mode, said first operation is performed in accordance with a set of semantics, and if said code executes in a kernel mode that is said privileged execution mode, said first operation is performed in accordance with said set of semantics so that runtime behavior exhibited when said first operation is performed while executing in said user mode is similar to runtime behavior exhibited when said first operation is performed while executing in said kernel mode.

10. The method of claim 1, wherein said scheduling and synchronization primitives perform operations on objects and said application programming interface includes one or more methods which perform said operations on said objects.

11. A non-transitory computer readable medium comprising code stored thereon for providing a set of one or more scheduling and synchronization primitives, the non-transitory computer readable medium comprising code stored thereon for:
    providing an application programming interface for performing one or more operations, each of said one or more operations corresponding to one of said scheduling and synchronization primitives;
    providing a set of one or more criteria indicating conditions as to when said scheduling and synchronization primitives are allowed to be performed; and
    determining, using said one or more criteria during execution of other code, whether to perform a requested one of said operations, said other code making a call using said application programming interface to perform said requested operation, said one or more criteria being determined in accordance with a plurality of different platforms, if said determining determines that said requested one of said operations is allowable and said requested operation is to be performed, then said other code is allowed to be executed on each of said different platforms in a privileged execution mode and a non-privileged execution mode, wherein first code of the application programming interface provides a same set of functionality for both the privileged execution mode and the non-privileged execution mode, said same set of functionality including functionality in connection with a deferred procedure call and an interrupt service routine, wherein the first code of the application programming interface simulates functionality in connection with any of a deferred procedure call executed in the non-privileged execution mode and an interrupt service routine executed in the non-privileged execution mode using threads executed in the non-privileged execution mode.

12. The non-transitory computer readable medium of claim 11, wherein said conditions indicate allowable execution contexts using an execution level and a spin lock held indicator, said execution level indicating a runtime execution context level associated with said other code at a current execution point, said spin lock held indicator providing a runtime indication as to whether a spin lock is currently acquired at said current execution point.

13. The non-transitory computer readable medium of claim 12, wherein said execution level is set to one of a plurality of execution level values, said plurality of execution level values including a thread level, a deferred procedure call level and an interrupt level, said thread level indicating that said current execution point corresponds to a body of code associated with a thread or a deferred work item, said deferred procedure call level indicating that said current execution point corresponds to a body of code associated with a deferred procedure call or a timer, and said interrupt level indicating that said current execution point corresponds to a body of code associated with an interrupt service routine.

14. The non-transitory computer readable medium of claim 12, further comprising code for updating said execution level and said spin lock held indicator during execution of said other code to reflect a current runtime execution state of said other code.

15. The non-transitory computer readable medium of claim 12, wherein said execution level and said spin lock held indicator are examined prior to performing said requested operation to determine whether to perform said requested operation.

16. The non-transitory computer readable medium of claim 11, wherein each of said plurality of different platforms includes at least one of an operating system or hardware which is different from another of said plurality of different platforms.

17. The non-transitory computer readable medium of claim 11, wherein said application programming interface provides an interface to a code module stored on said non-transitory computer readable medium that:
  performs said one or more operations when said other code executes in said non-privileged execution mode that is user mode; and
  performs said one or more operations when said other code executes in said privileged execution mode that is kernel mode.

18. The non-transitory computer readable medium of claim 11, wherein said other code is allowed to be executed in a user mode that is said non-privileged execution mode and a kernel mode that is said privileged execution mode, and said requested one of said operations is performed in said user mode and said kernel mode in accordance with a same set of semantics so that runtime behavior exhibited when said requested one of said operations is performed while executing in said user mode is similar to runtime behavior exhibited when said requested one of said operations is performed while executing in said kernel mode.

19. The non-transitory computer readable medium of claim 11, wherein said scheduling and synchronization primitives perform operations on objects and said application programming interface includes one or more methods which perform said operations on said objects.

20. A non-transitory computer readable medium comprising code stored thereon for providing a set of one or more scheduling and synchronization primitives, the non-transitory computer readable medium comprising code stored thereon for:
  providing an application programming interface for performing one or more operations, each of said one or more operations corresponding to one of said scheduling and synchronization primitives;
  providing a set of one or more criteria indicating conditions as to when said scheduling and synchronization primitives are allowed to be performed, said conditions indicating allowable execution contexts using an execution level and a spin lock held indicator; and
  determining, during execution of other code, whether to perform a requested one of said operations using said one or more criteria, said other code making a call using said application programming interface to perform said requested operation, said one or more criteria being determined in accordance with a plurality of different platforms so that said other code is portable to each of said different platforms, and wherein said other code is executing in one of a user mode or a kernel mode, and said requested operation is performed in said user mode if said other code is executing in said user mode and is performed in said kernel mode if said other code is executing in said kernel mode, said criteria including kernel-mode semantics for features of said kernel mode simulated when executing in said user mode, wherein first code of the application programming interface provides a same set of functionality for both the user mode and the kernel mode, said same set of functionality including functionality in connection with a deferred procedure call and an interrupt service routine, wherein the first code of the application programming interface simulates functionality in connection with any of a deferred procedure call executed in the user mode and an interrupt service routine executed in the user mode using threads executed in the user mode.

* * * * *